(12) United States Patent
Sugita

(10) Patent No.: US 7,289,281 B1
(45) Date of Patent: Oct. 30, 2007

(54) ZOOM LENS AND IMAGE PROJECTION APPARATUS HAVING THE SAME

(75) Inventor: Shigenobu Sugita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/626,440

(22) Filed: Jan. 24, 2007

(30) Foreign Application Priority Data

Feb. 2, 2006 (JP) .............................. 2006-025738

(51) Int. Cl.
*G02B 9/00* (2006.01)

(52) U.S. Cl. ...................................... 359/797; 359/784

(58) Field of Classification Search ................ 359/797, 359/778, 779, 780, 781, 784, 686, 689, 691
See application file for complete search history.

(56) References Cited

U.S. PATENT DOCUMENTS 6,816,320 B2 11/2004 Wada 7,016,118 B2 3/2006 Wada

*Primary Examiner*—Timothy Thompson
(74) *Attorney, Agent, or Firm*—Cowan, Liebowitz & Latman, P.C.

(57) ABSTRACT

Provided is a zoom lens which is telecentric on a reduction side, including a plurality of lens units, in which the zoom lens satisfies the following conditions:

$$vdp > 75$$

$$fw/fp < 0.6$$

where ha indicates a height of a paraxial marginal ray passing through the zoom lens, and hb indicates a height of a paraxial chief ray passing through the zoom lens, where, among a plurality of positive lenses in the zoom lens, a positive lens whose hb/ha is the smallest is defined as a smallest positive lens in at least a part of a zoom range from a wide-angle end to a telephoto end, and where vdp indicates an Abbe constant of a material of the smallest positive lens, fp indicates a focal length of a lens unit including the smallest positive lens, and fw indicates a focal length of an entire system at the wide-angle end.

15 Claims, 22 Drawing Sheets

ZOOM LENS AND IMAGE PROJECTION APPARATUS HAVING THE SAME

BACKGROUND OF THE INVENTION

1. Field of the Invention

The present invention relates to a zoom lens, for example, a zoom lens suitable for an optical system of an optical apparatus, such as a projection optical system of a liquid crystal projector which projects image information on a predetermined surface, and a photographing optical system of a camera.

2. Description of the Related Art

For a zoom lens of a liquid crystal projector, there are extremely strict requirements for specifications regarding color misregistration (lateral chromatic aberration) in response to a demand for higher definition. A zoom ratio of the zoom lens of the liquid crystal projector has been approximately 1.2 to 1.3, which has not been very large as compared with specifications of an interchangeable lens of a single-lens reflex camera or the like. Therefore, in designing the zoom lens for the liquid crystal projector, correction of the lateral chromatic aberration has been considered as the most important problem, and a zoom lens which has solved the problem has been proposed (see, U.S. Pat. No. 6,816,320 and U.S. Pat. No. 7,016,118).

In recent years, it has been strongly desired that the zoom lens for use in the liquid crystal projector have a higher zoom ratio, a wider angle of view, a larger aperture for using illumination light with higher efficiency, and high optical performance in an entire zoom range. Those items are largely involved in various aberrations of the zoom lens, which mainly include a spherical aberration and the lateral chromatic aberration, and with variations of the aberrations due to zooming of the zoom lens.

In particular, of those items, it has been demanded that the variations of the lateral chromatic aberration and the spherical aberration due to the zooming which largely affect the optical performance are reduced.

However, in order to obtain the high optical performance while correcting the lateral chromatic aberration and the spherical aberration over the entire zoom range, constructions and materials of the respective lenses must be set appropriately.

SUMMARY OF THE INVENTION

It is an object of the present invention to provide a zoom lens which favorably corrects the various aberrations caused by the zooming, and has favorable optical performance over the entire screen. The zoom lens of the present invention is particularly suitable, for example, for an optical apparatus such as an image projection apparatus (projector) and an image pickup apparatus such as a camera.

According to an aspect of the present invention, a zoom lens, which is telecentric on a reduction side, includes a plurality of lens units, in which a smallest positive lens is defined as a positive lens whose hb/ha is smallest among a plurality of positive lenses in the zoom lens in at least a part of a zoom range from a wide-angle end to a telephoto end where ha represents a height of a paraxial marginal ray passing through the zoom lens and hb represents a height of a paraxial chief ray passing through the zoom lens, the zoom lens satisfies following conditions:

$$vdp>75$$

$$fw/fp<0.6$$

where vdp indicates an Abbe constant of a material of the smallest positive lens, fp indicates a focal length of a lens unit including the smallest positive lens, and fw indicates a focal length of an entire system at the wide-angle end.

According to another aspect of the present invention, a zoom lens, which is telecentric on a reduction side, includes a plurality of lens units, in which: a first negative lens whose effective diameter is smallest is disposed within a range of a length 0.6 L to a length 0.9 L from a first lens surface on a most enlargement side of the zoom lens at a wide-angle end where L represents an overall lens length; a smallest positive lens is disposed within a range of a length 0.2 L on an enlargement side of the first negative lens; and the zoom lens satisfies following conditions:

$$vdp>75$$

$$fw/fp<0.6$$

where vdp indicates Abbe constant of a material of the smallest positive lens, fp indicates a focal length of a lens unit including the smallest positive lens, and fw indicates a focal length of an entire system at the wide-angle end.

According to another aspect of the present invention, an image projection apparatus, includes: a display unit for forming an original; and a zoom lens for projecting the original formed by the display unit onto a surface to be projected, in which: a first negative lens whose effective diameter is smallest is disposed within a range of a length 0.6 L to a length 0.9 L from a first lens surface on a most enlargement side of the zoom lens at a wide-angle end when an overall lens length is L; a smallest positive lens is disposed within a range of a length 0.2 L on an enlargement side of the first negative lens; and the zoom lens satisfies following conditions:

$$vdp>75$$

$$fw/fp<0.6$$

where vdp indicates Abbe constant of a material of the smallest positive lens, fp indicates a focal length of a lens unit including the smallest positive lens, and fw indicates a focal length of an entire system at the wide-angle end.

According to another aspect of the present invention, an image pickup apparatus, includes: a photoelectric transducer; and a zoom lens for guiding light from a subject onto the photoelectric transducer, in which: a first negative lens whose effective diameter is smallest is disposed within a range of a length 0.6 L to a length 0.9 L from a first lens surface on a most enlargement side of the zoom lens at a wide-angle end when an overall lens length is L; a smallest positive lens is disposed within a range of a length 0.2 L on an enlargement side of the first negative lens; and the zoom lens satisfies following conditions:

$$vdp > 75$$

$$fw/fp < 0.6$$

where vdp indicates Abbe constant of a material of the smallest positive lens, fp indicates a focal length of a lens unit including the smallest positive lens, and fw indicates a focal length of an entire system at the wide-angle end.

Further features of the present invention will become apparent from the following description of exemplary embodiments with reference to the attached drawings.

DESCRIPTION OF THE EMBODIMENTS

A description will be made below of embodiments of a zoom lens of the present invention, and an image projection apparatus and an image pickup apparatus, each of which has the zoom lens.

Figure 1:
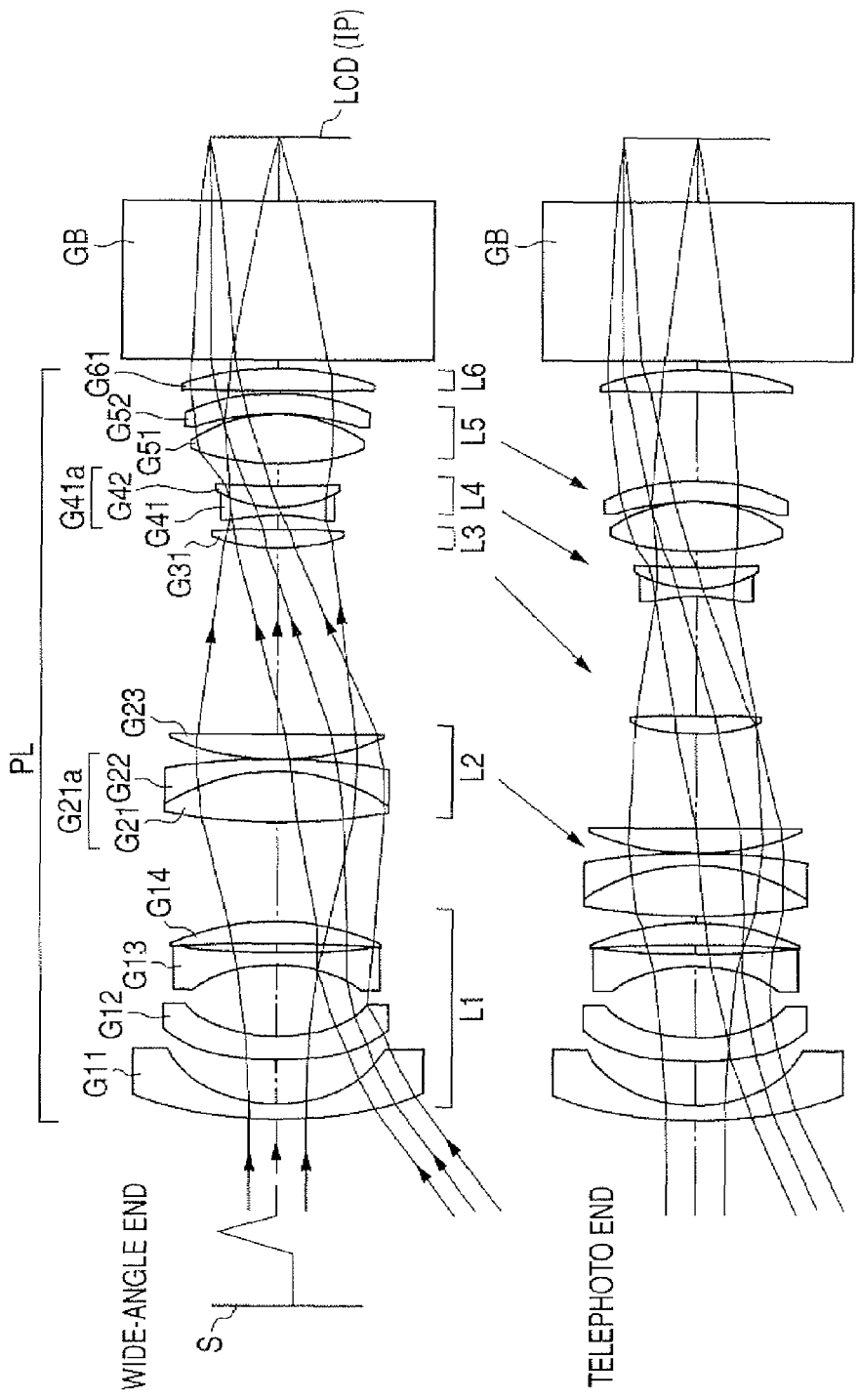
FIG. 1 is main portion schematic views of an image projection apparatus using a zoom lens of Embodiment 1.

FIG. 1 is main portion schematic views at a wide-angle end and telephoto end of an image projection apparatus (liquid crystal video projector) using a zoom lens of Embodiment 1.

Figure 2:
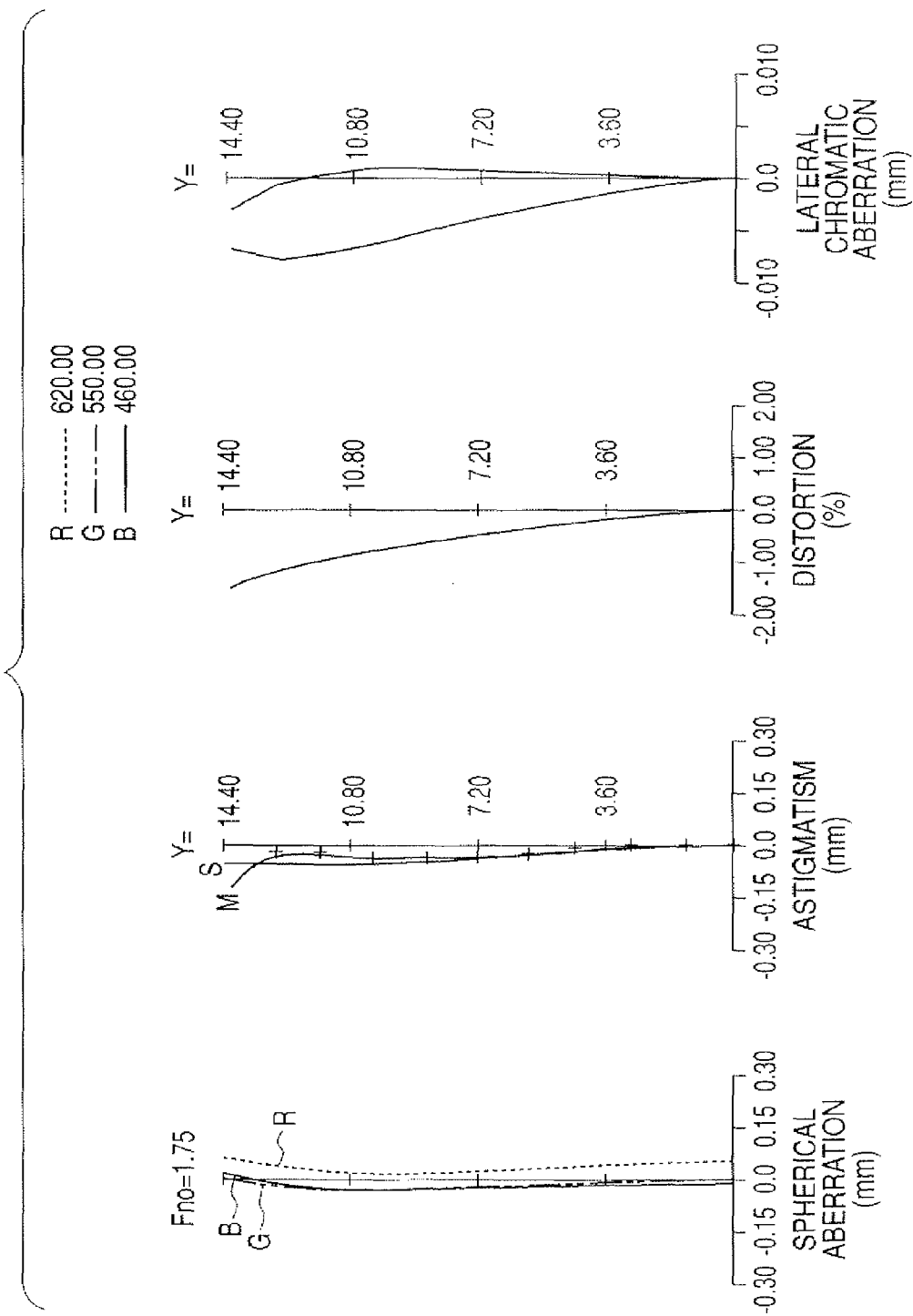
FIG. 2 is aberration diagrams at a wide-angle end of the zoom lens of Embodiment 1.
Figure 3:
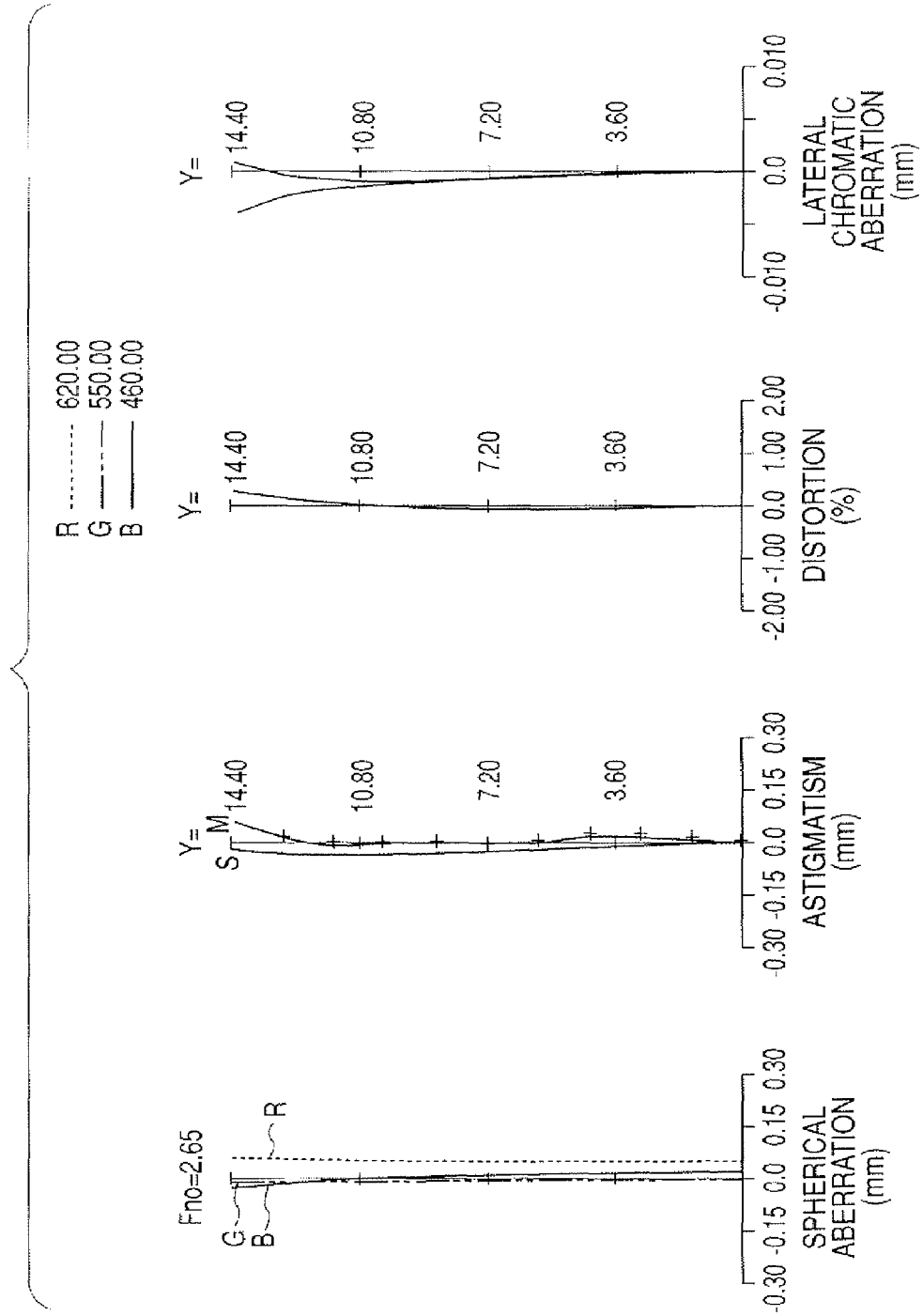
FIG. 3 is aberration diagrams at a telephoto end of the zoom lens of Embodiment 1.

FIGS. 2 and 3 are aberration diagrams at the wide-angle end (short focal length side) and the telephoto end (long focal length side) in a case where a length (length from a first lens unit) to a screen is 1760 mm in Embodiment 1.

Figure 4:
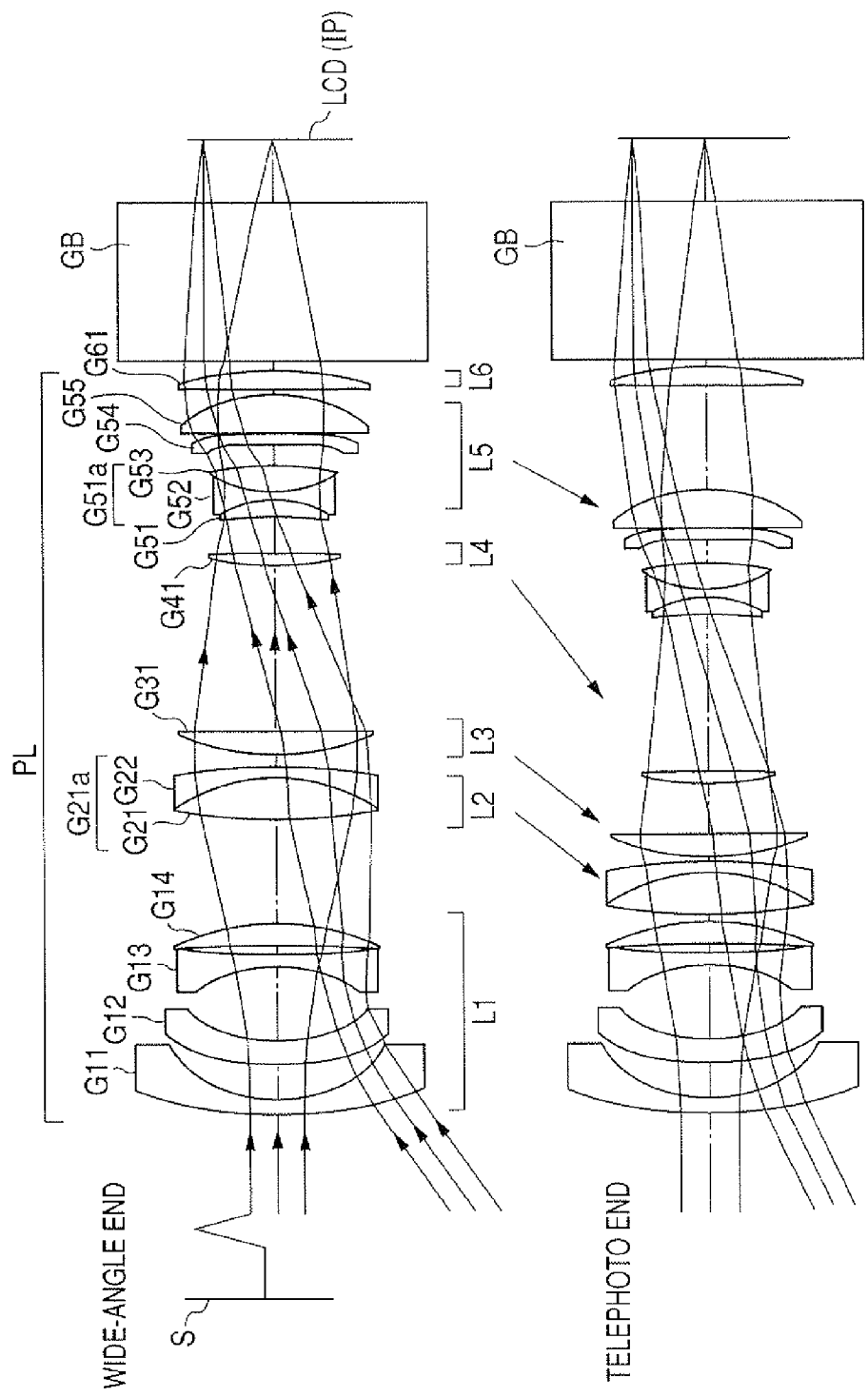
FIG. 4 is main portion schematic views of an image projection apparatus using a zoom lens of Embodiment 2.

FIG. 4 is main portion schematic views at a wide-angle end and telephoto end of an image projection apparatus using a zoom lens of Embodiment 2.

Figure 5:
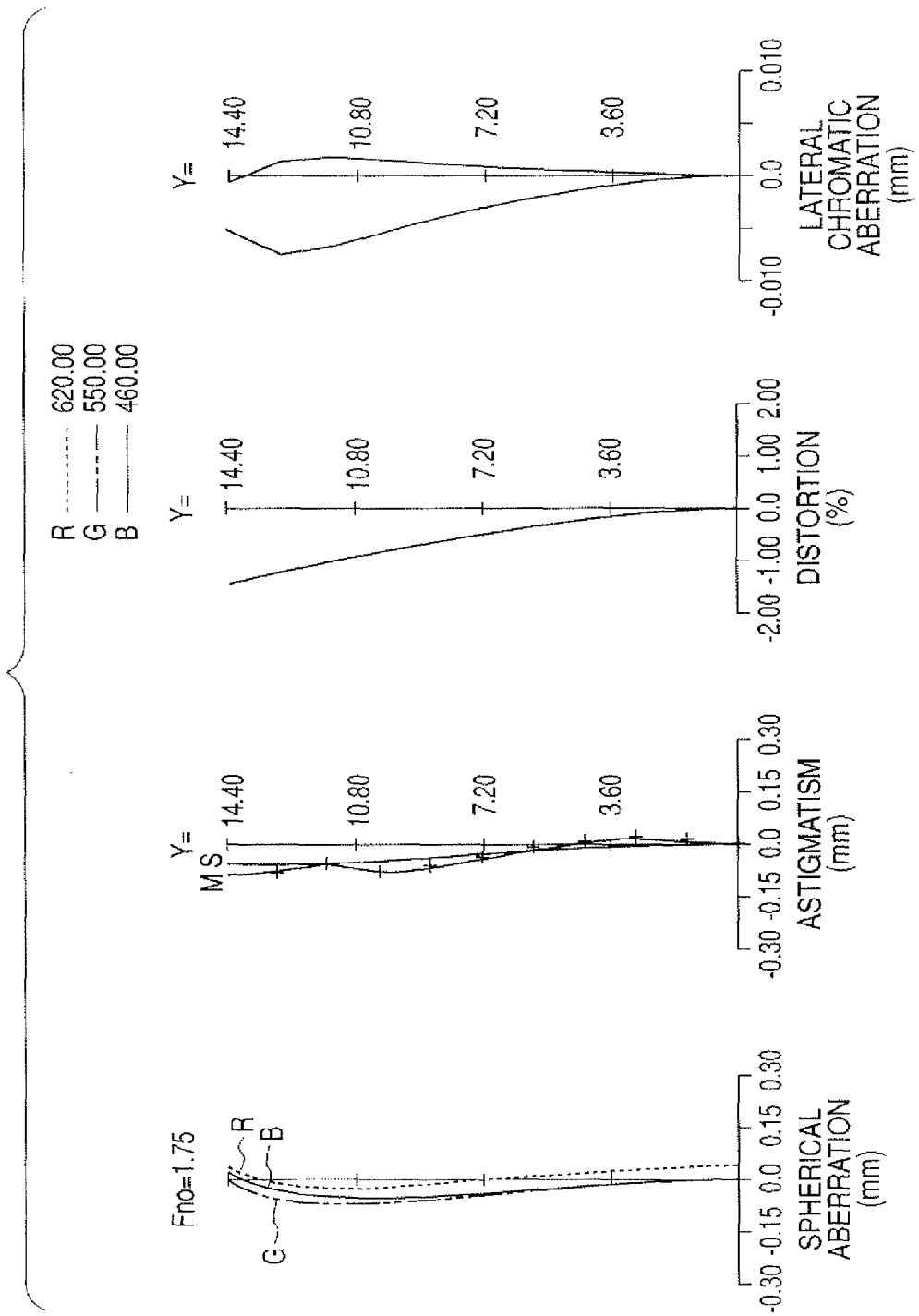
FIG. 5 is aberration diagrams at a wide-angle end of the zoom lens of Embodiment 2.
Figure 6:
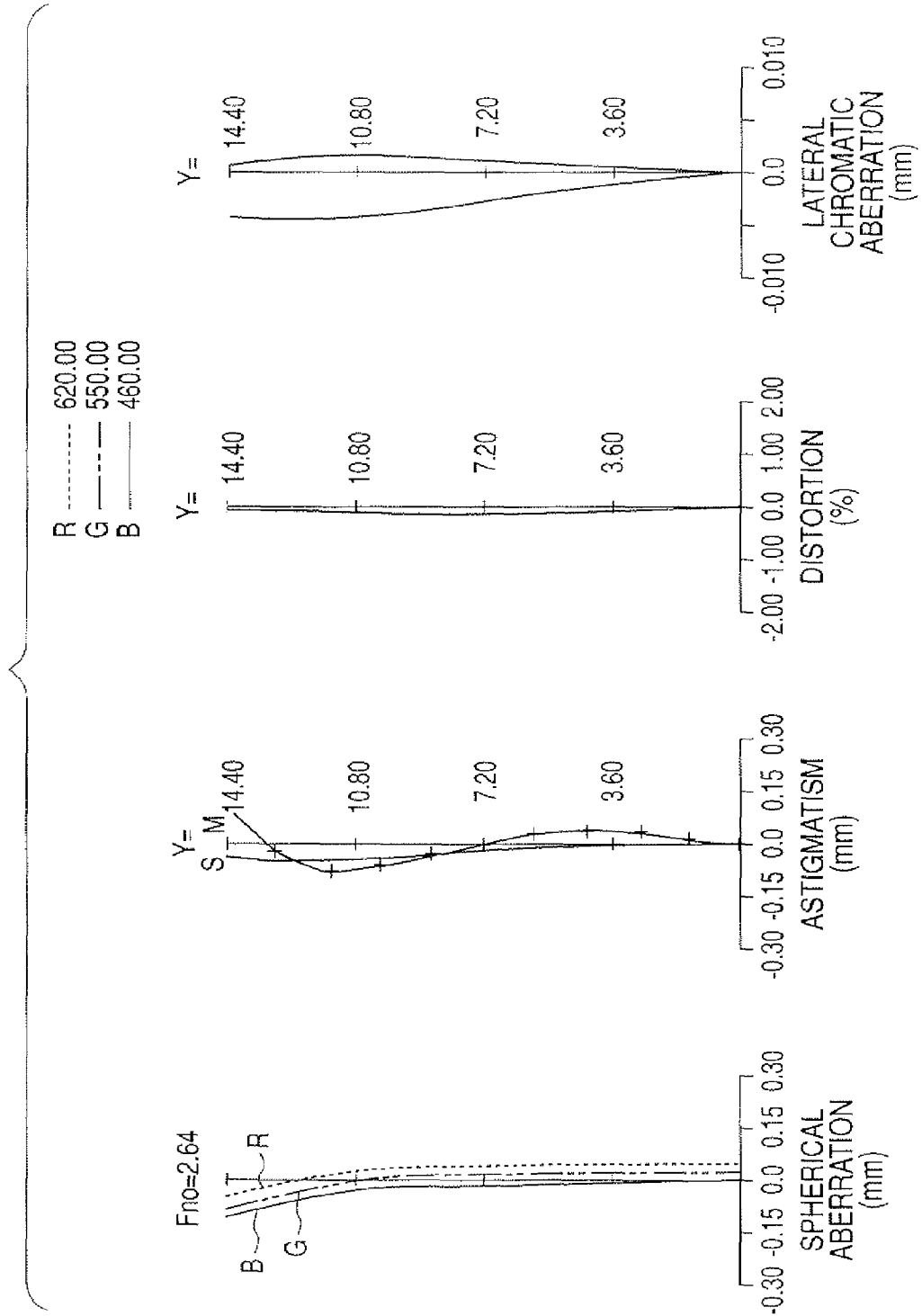
FIG. 6 is aberration diagrams at a telephoto end of the zoom lens of Embodiment 2.

FIGS. 5 and 6 are aberration diagrams at the wide-angle end and the telephoto end in a case where the length to the screen is 1760 mm in Embodiment 2.

Figure 7:
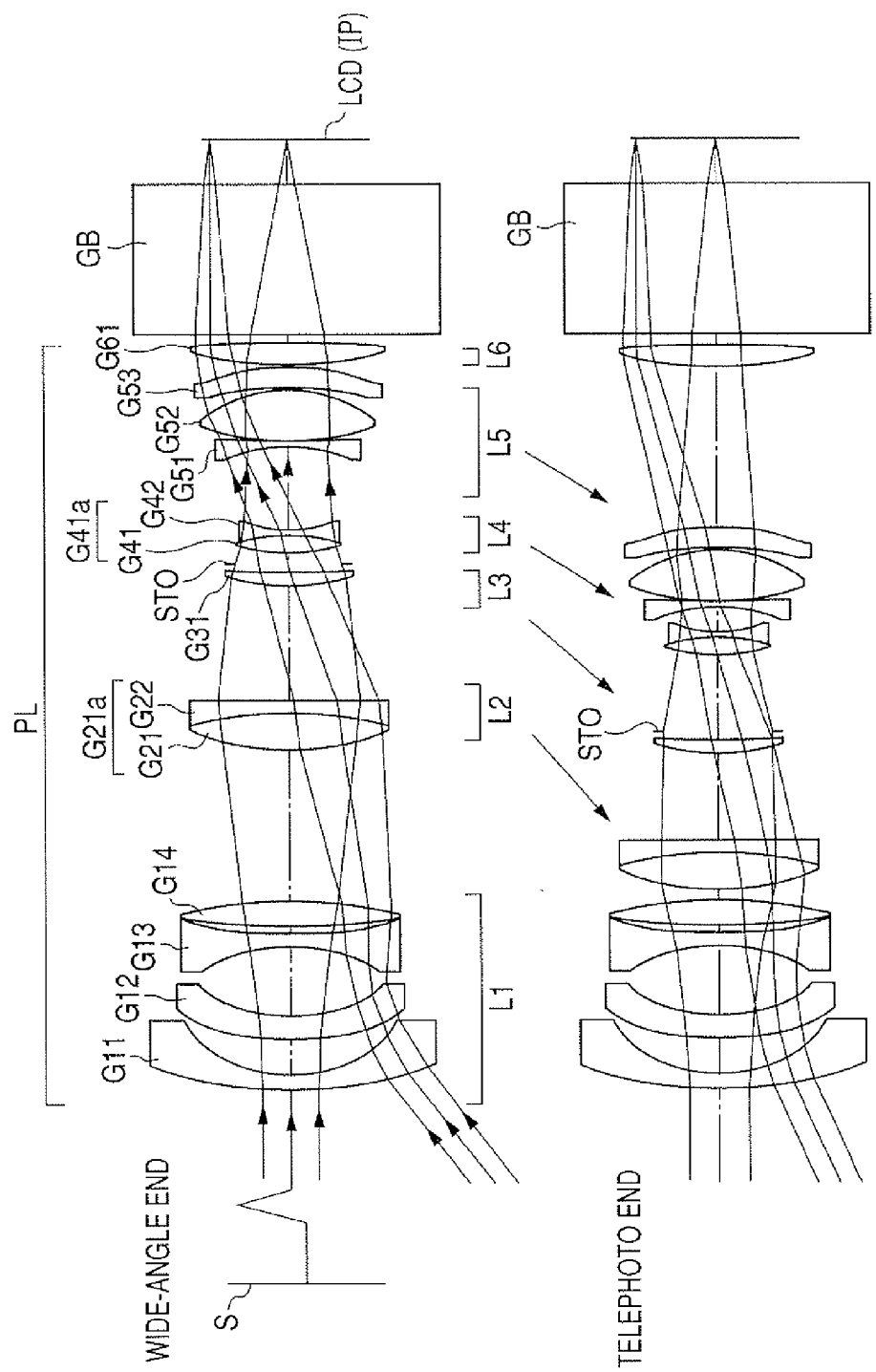
FIG. 7 is main portion schematic views of an image projection apparatus using a zoom lens of Embodiment 3.

FIG. 7 is main portion schematic views at a wide-angle end and telephoto end of an image projection apparatus using a zoom lens of Embodiment 3.

Figure 8:
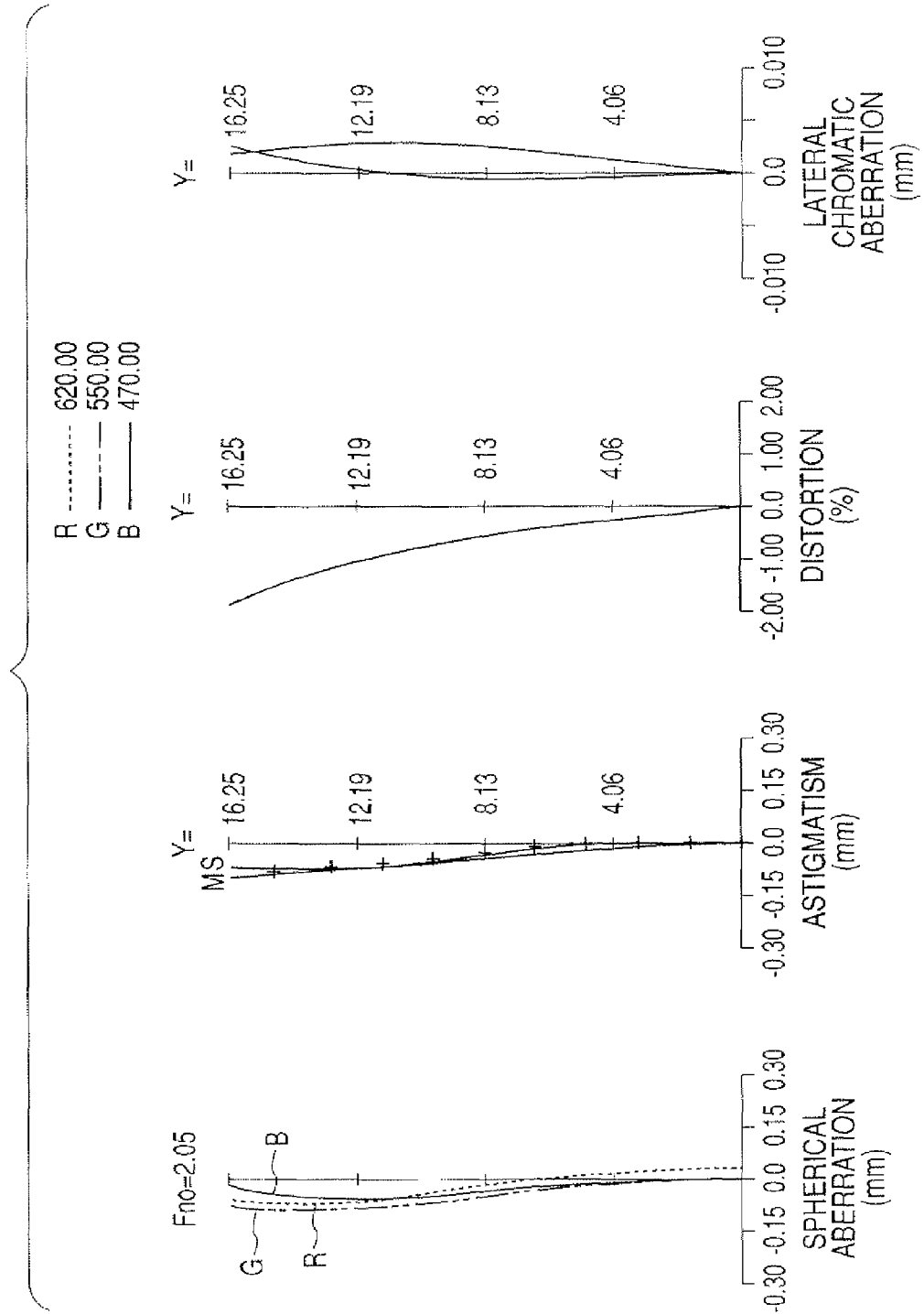
FIG. 8 is aberration diagrams at a wide-angle end of the zoom lens of Embodiment 3.
Figure 9:
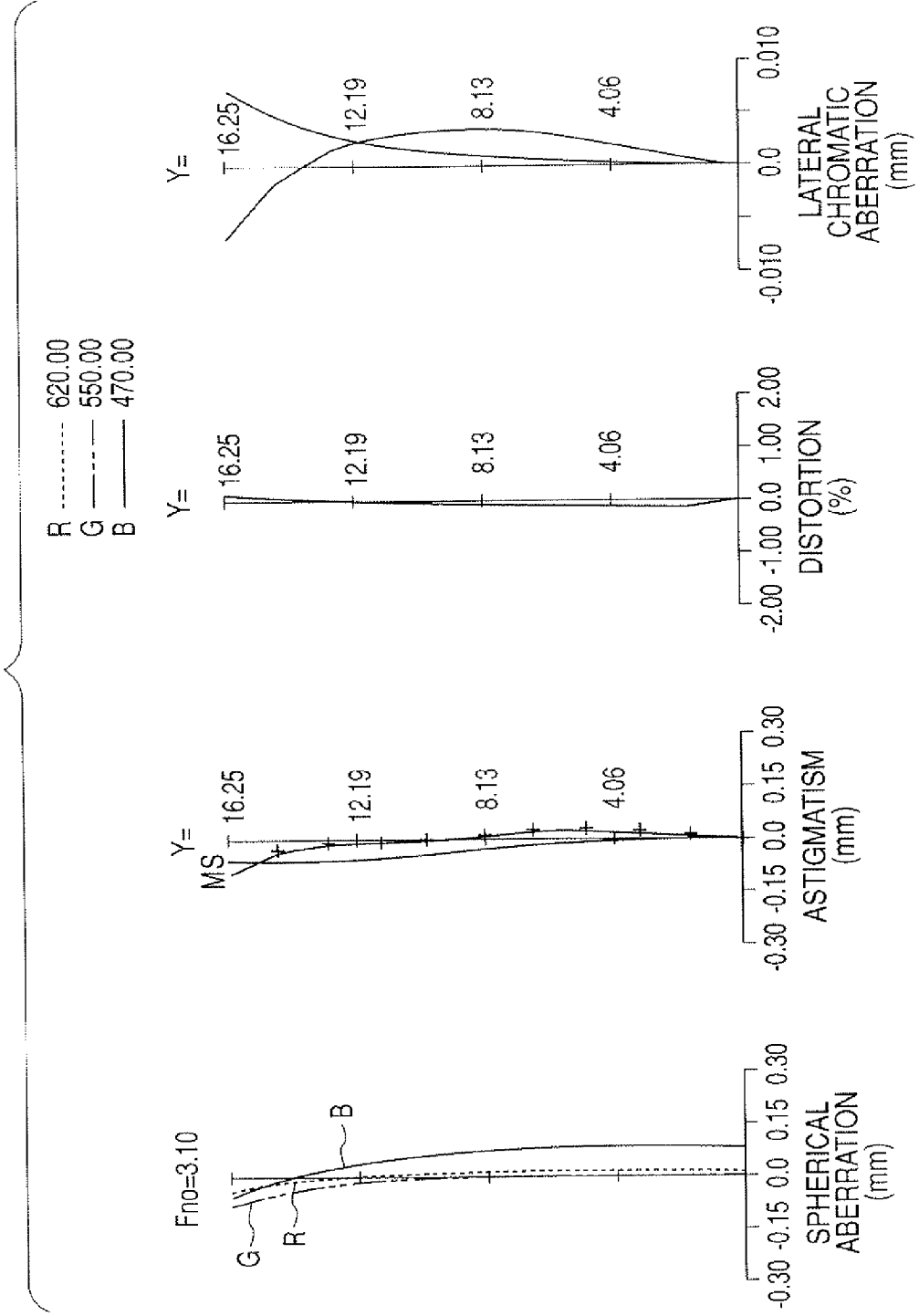
FIG. 9 is aberration diagrams at a telephoto end of the zoom lens of Embodiment 3.

FIGS. 8 and 9 are aberration diagrams at the wide-angle end and the telephoto end in a case where the length to the screen is 2100 mm in Embodiment 3.

Figure 10:
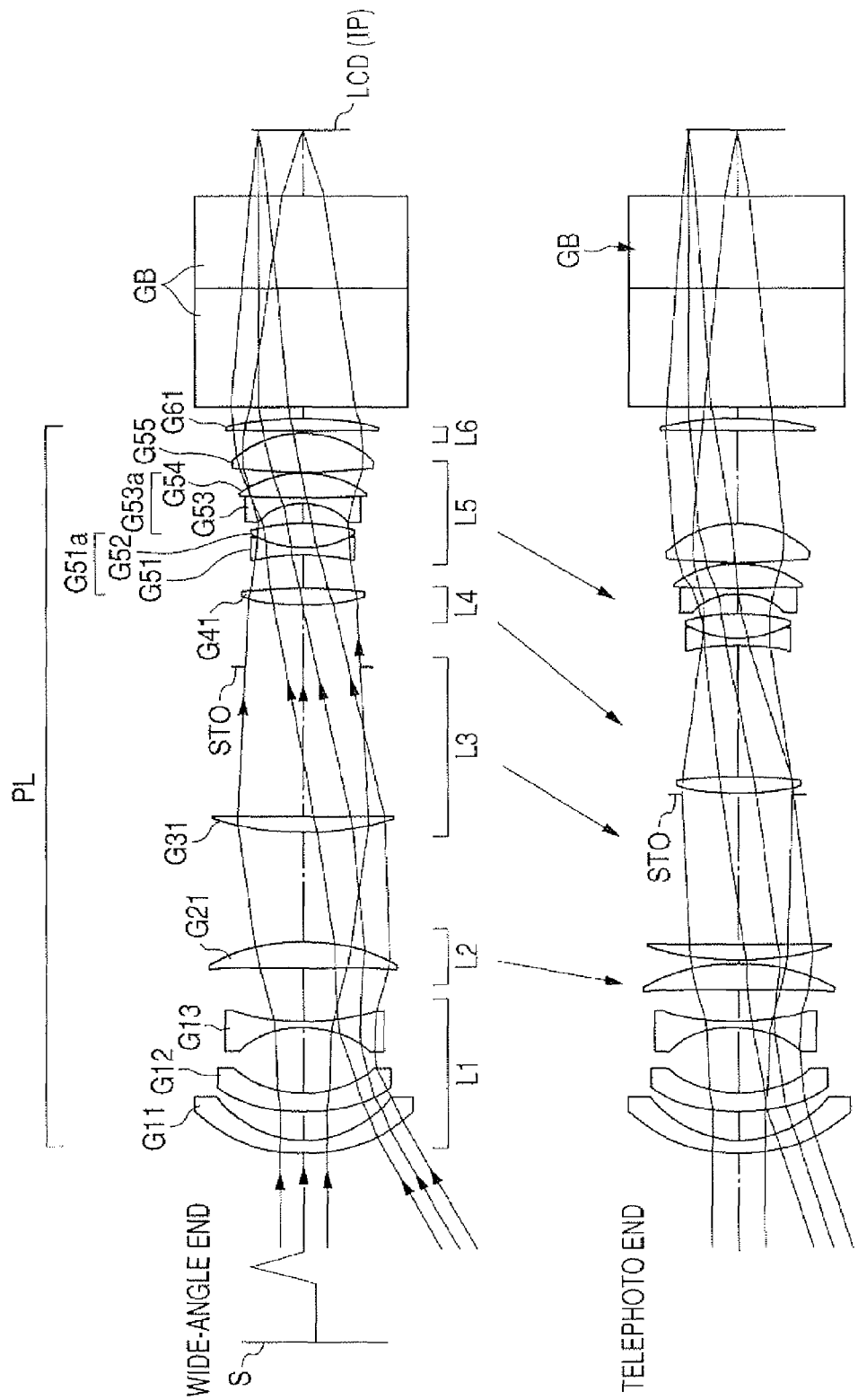
FIG. 10 is main portion schematic views of an image projection apparatus using a zoom lens of Embodiment 4.

FIG. 10 is main portion schematic views at a wide-angle end and telephoto end of an image projection apparatus using a zoom lens of Embodiment 4.

Figure 11:
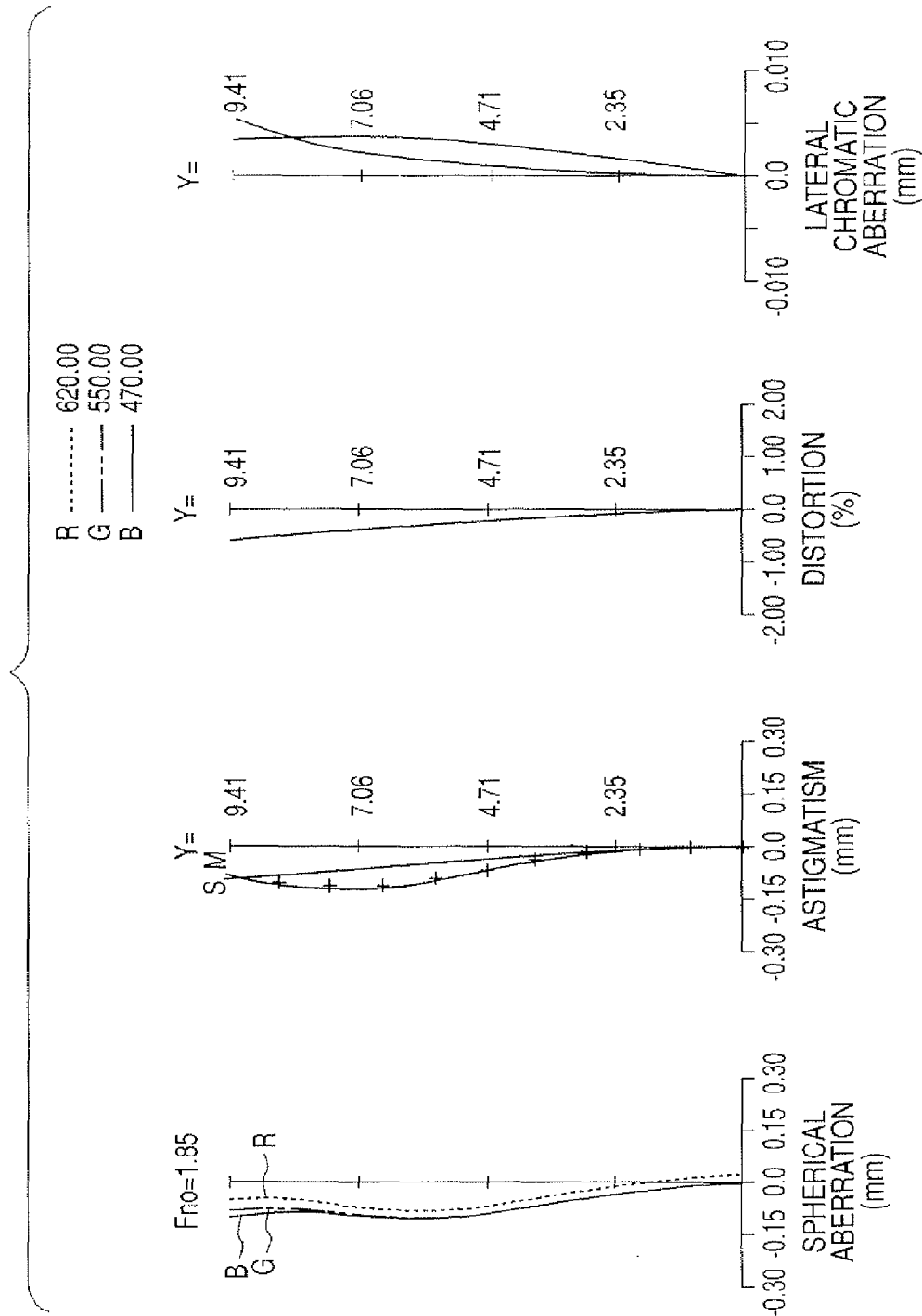
FIG. 11 is aberration diagrams at a wide-angle end of the zoom lens of Embodiment 4.
Figure 12:
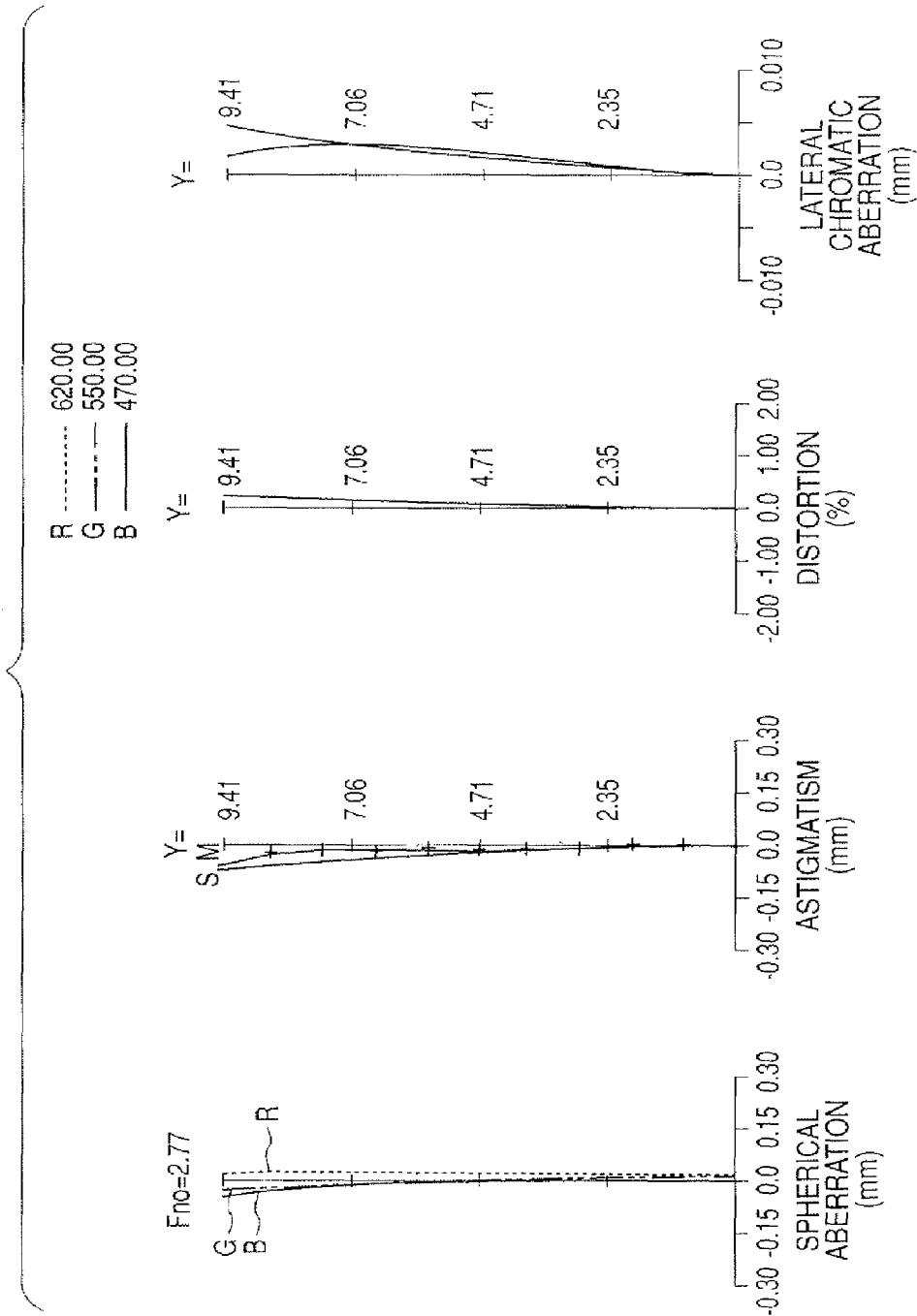
FIG. 12 is aberration diagrams at a telephoto end of the zoom lens of Embodiment 4.

FIGS. 11 and 12 are aberration diagrams at the wide-angle end and the telephoto end in a case where the length to the screen is 2100 mm in Embodiment 4.

Figure 13:
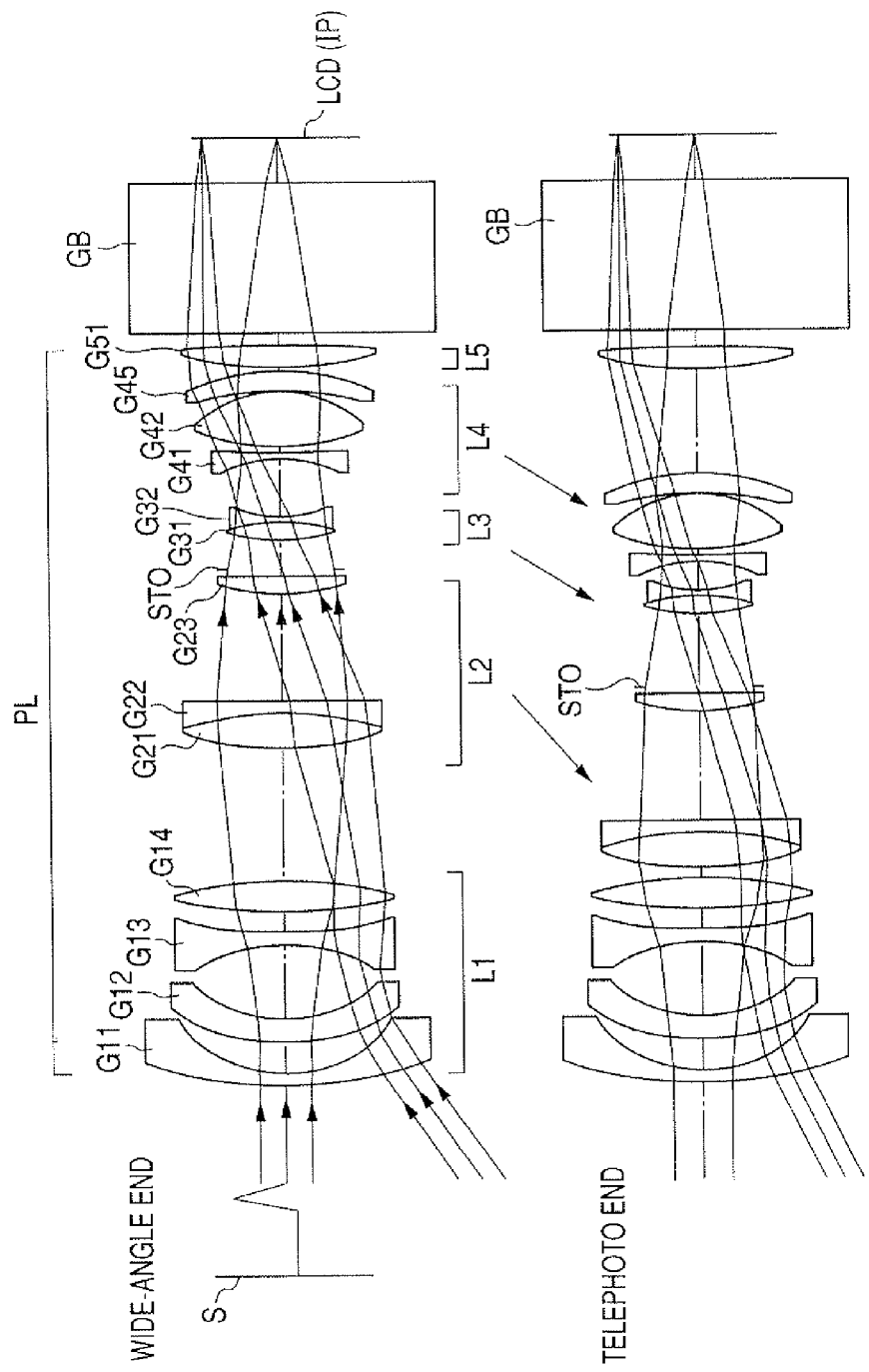
FIG. 13 is main portion schematic views of an image projection apparatus using a zoom lens of Embodiment 5.

FIG. 13 is main portion schematic views at a wide-angle end and telephoto end of an image projection apparatus using a zoom lens of Embodiment 5.

Figure 14:
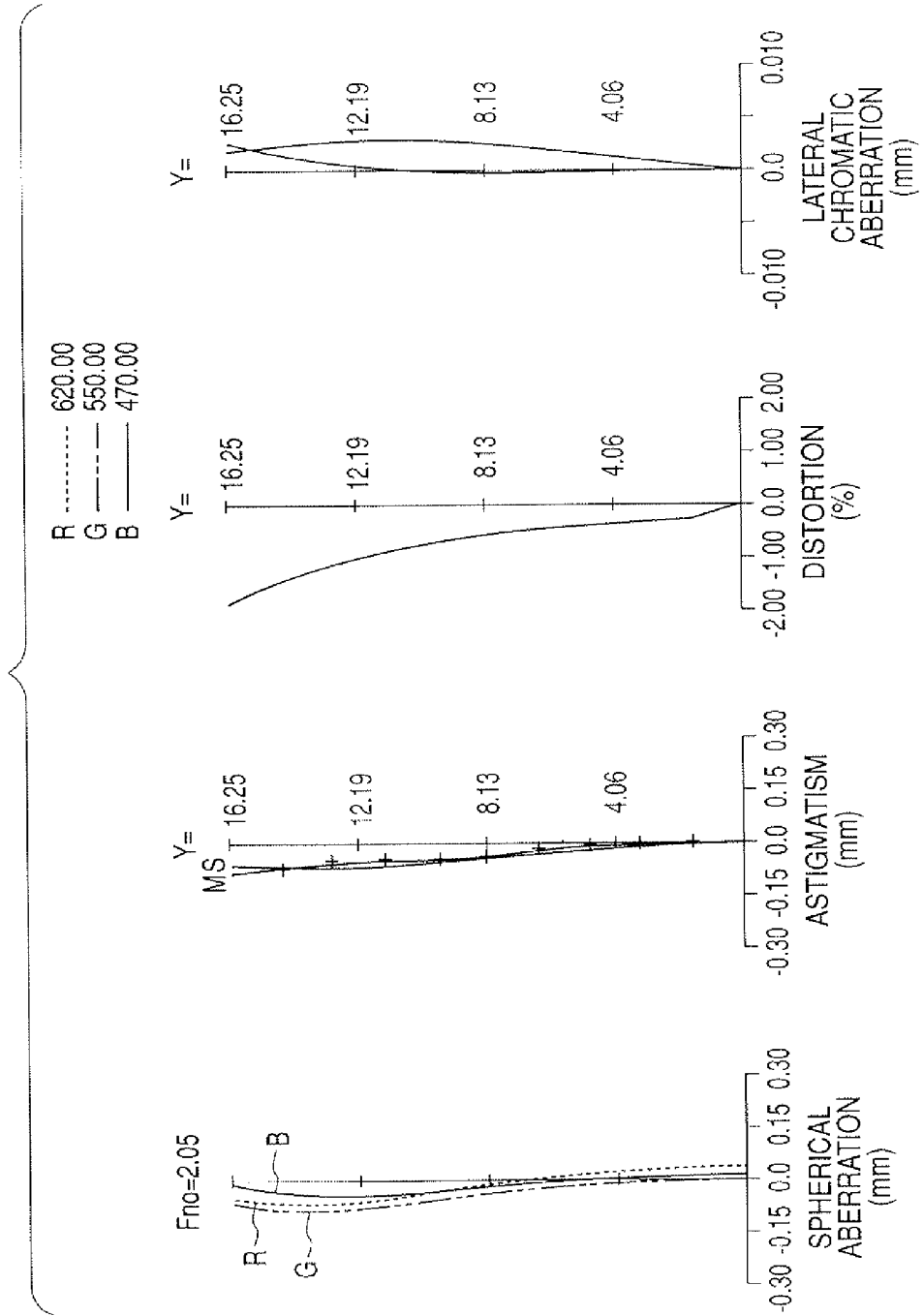
FIG. 14 is aberration diagrams at a wide-angle end of the zoom lens of Embodiment 5.
Figure 15:
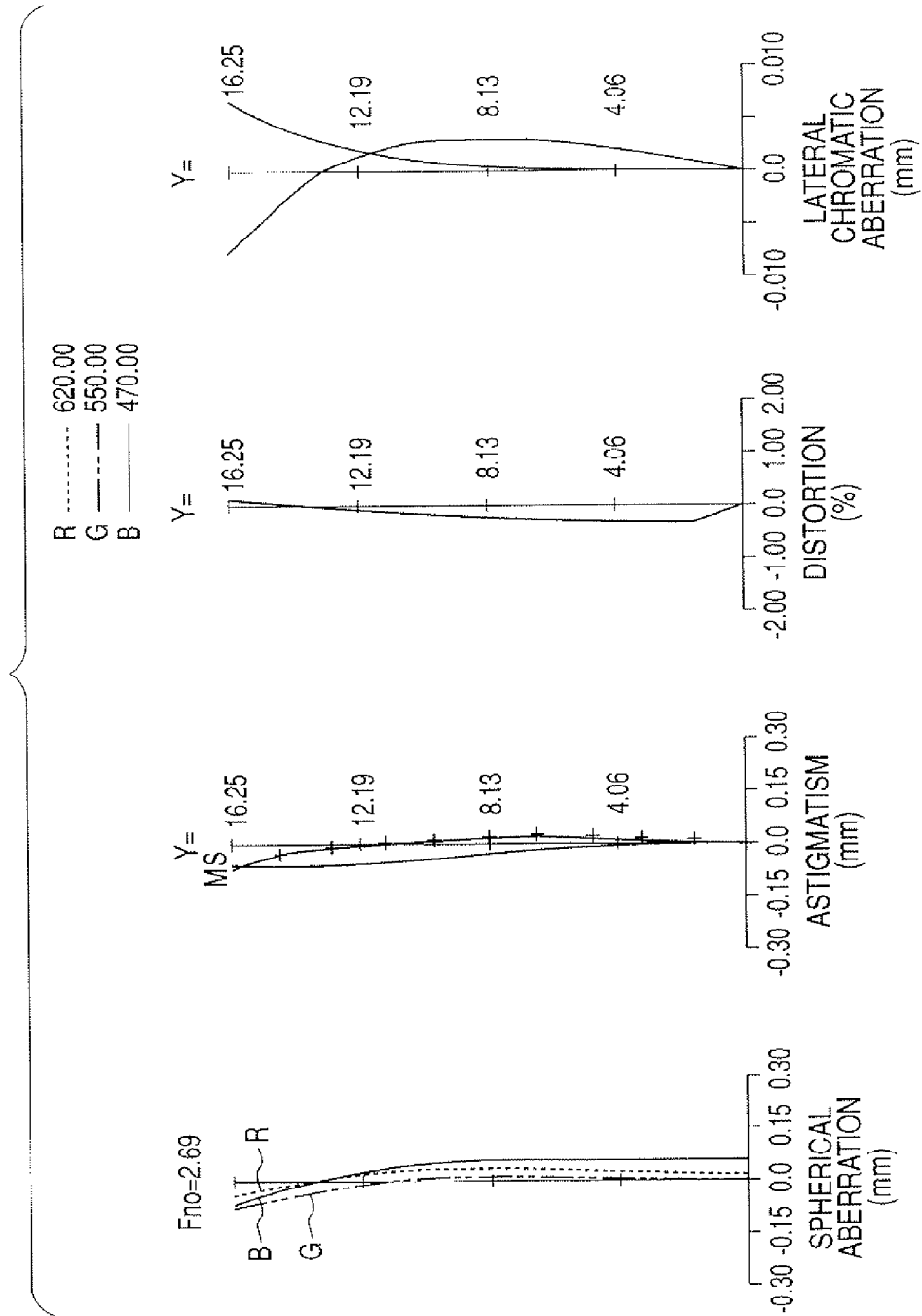
FIG. 15 is aberration diagrams at a telephoto end of the zoom lens of Embodiment 5.

FIGS. 14 and 15 are aberration diagrams at the wide-angle end and the telephoto end in a case where the length to the screen is 2100 mm in Embodiment 5.

Figure 16:
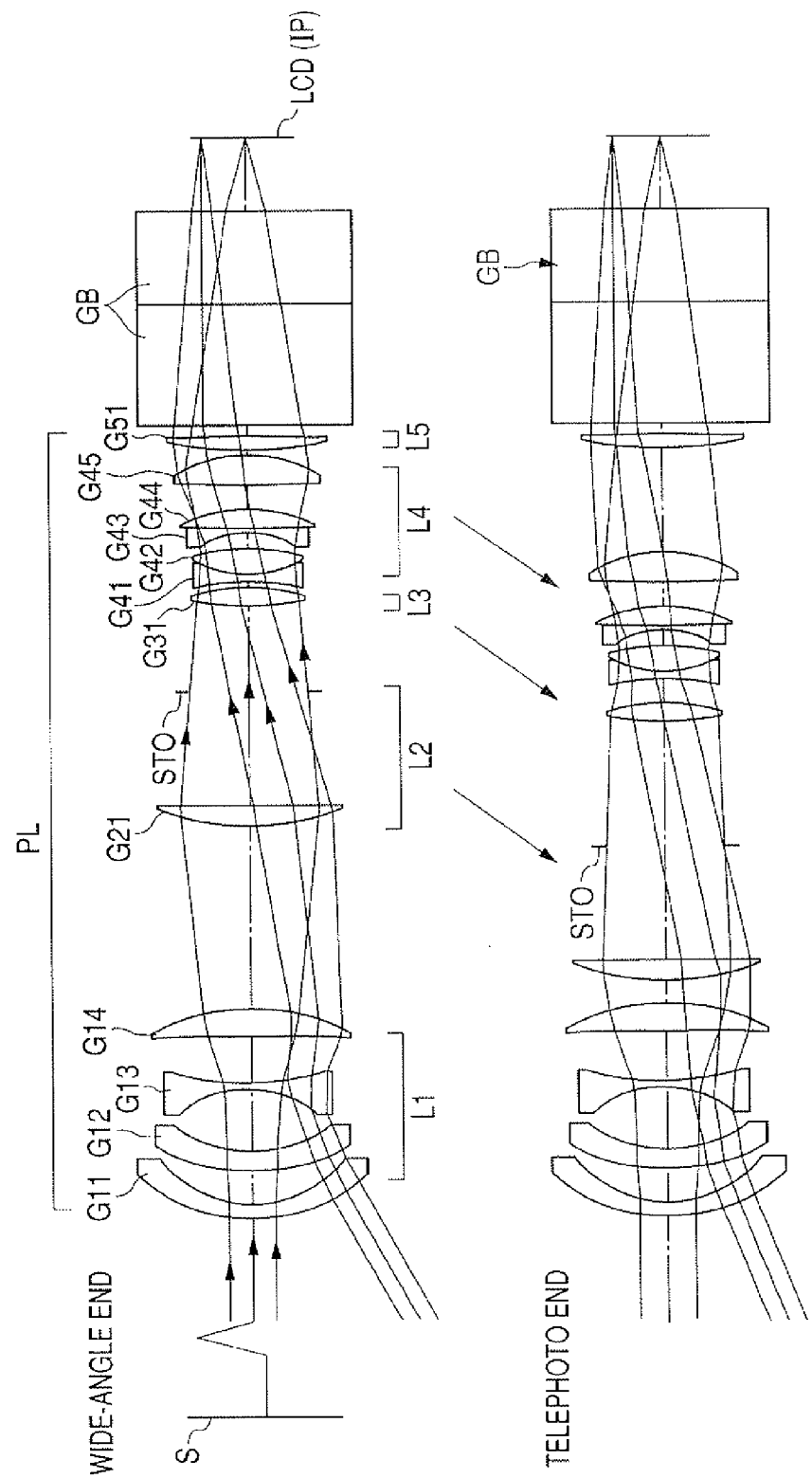
FIG. 16 is main portion schematic views of an image projection apparatus using a zoom lens of Embodiment 6.

FIG. 16 is main portion schematic views at a wide-angle end and telephoto end of an image projection apparatus using a zoom lens of Embodiment 6.

Figure 17:
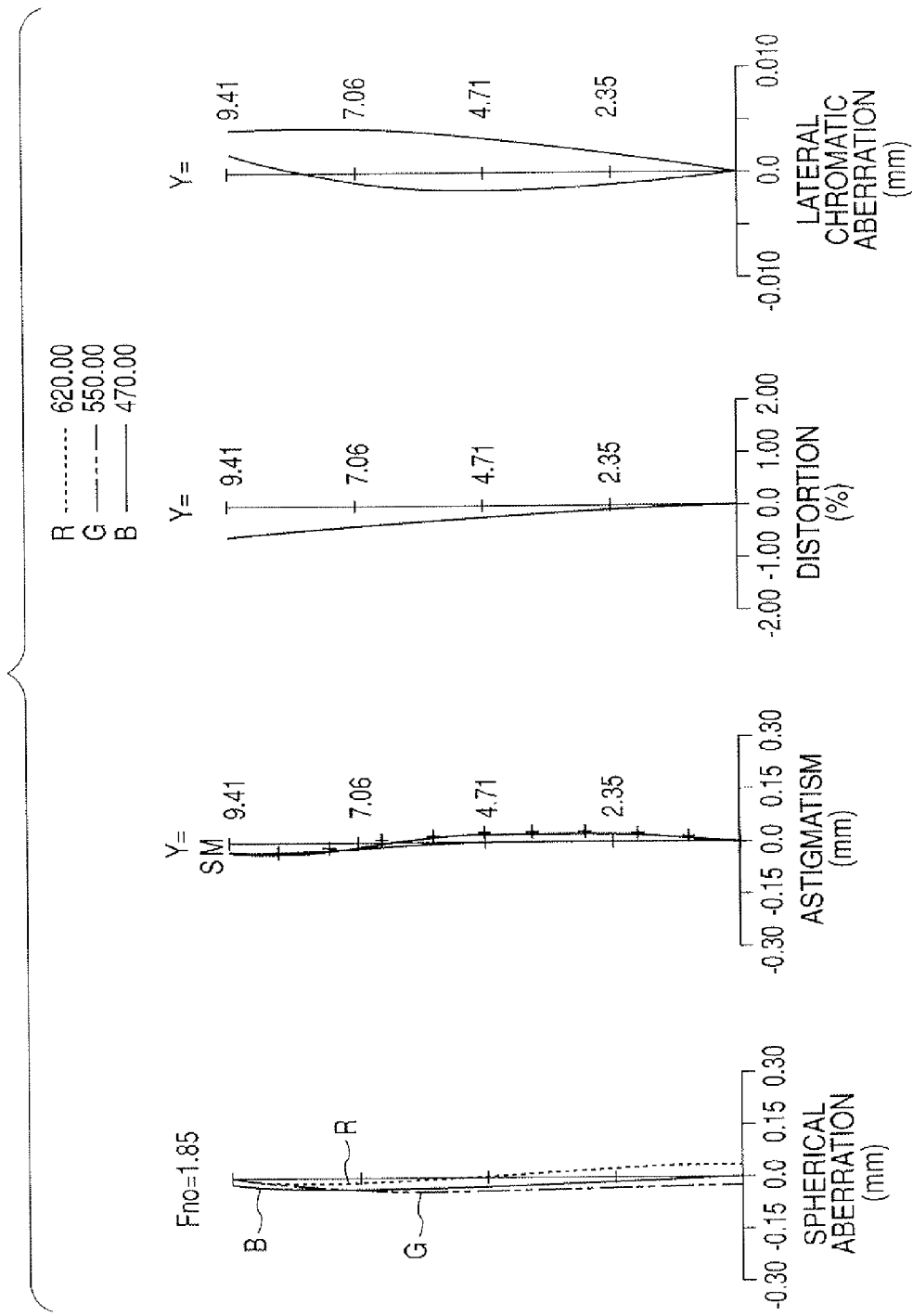
FIG. 17 is aberration diagrams at a wide-angle end of the zoom lens of Embodiment 6.
Figure 18:
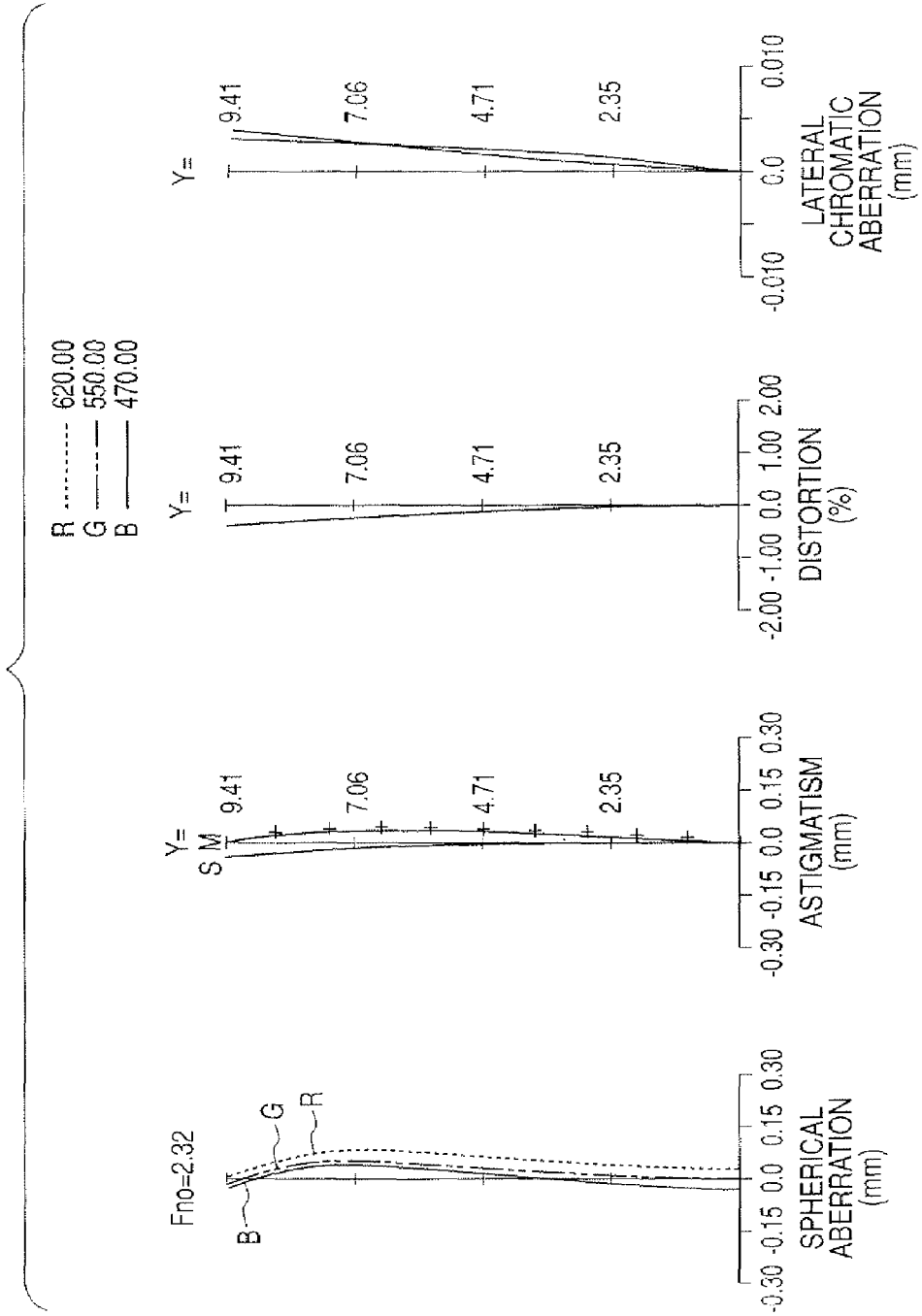
FIG. 18 is aberration diagrams at a telephoto end of the zoom lens of Embodiment 6.

FIGS. 17 and 18 are aberration diagrams at the wide-angle end and the telephoto end in a case where the length to the screen is 2100 mm in Embodiment 6.

Figure 19:
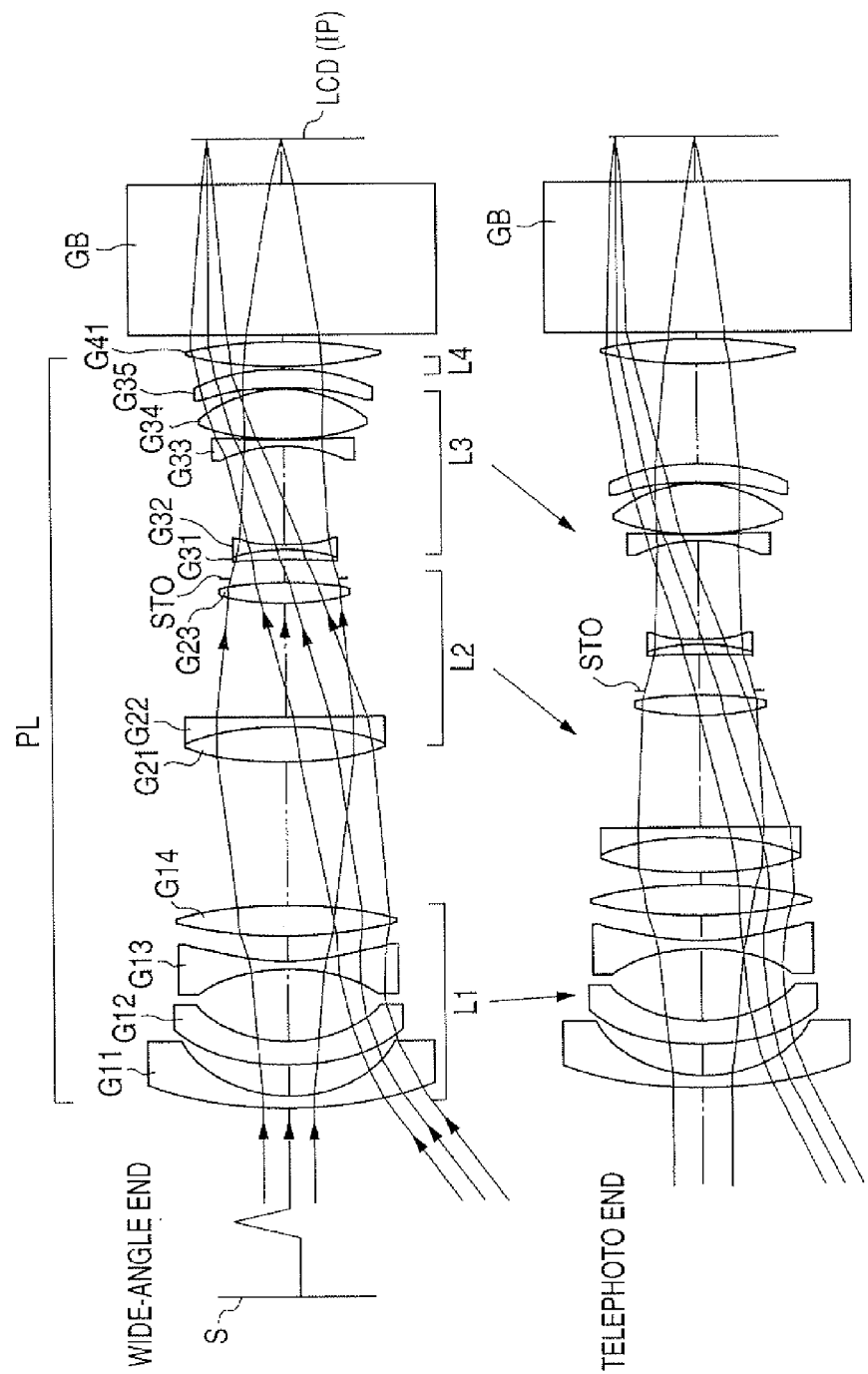
FIG. 19 is main portion schematic views of an image projection apparatus using a zoom lens of Embodiment 7.

FIG. 19 is main portion schematic views at a wide-angle end and telephoto end of an image projection apparatus using a zoom lens of Embodiment 7.

Figure 20:
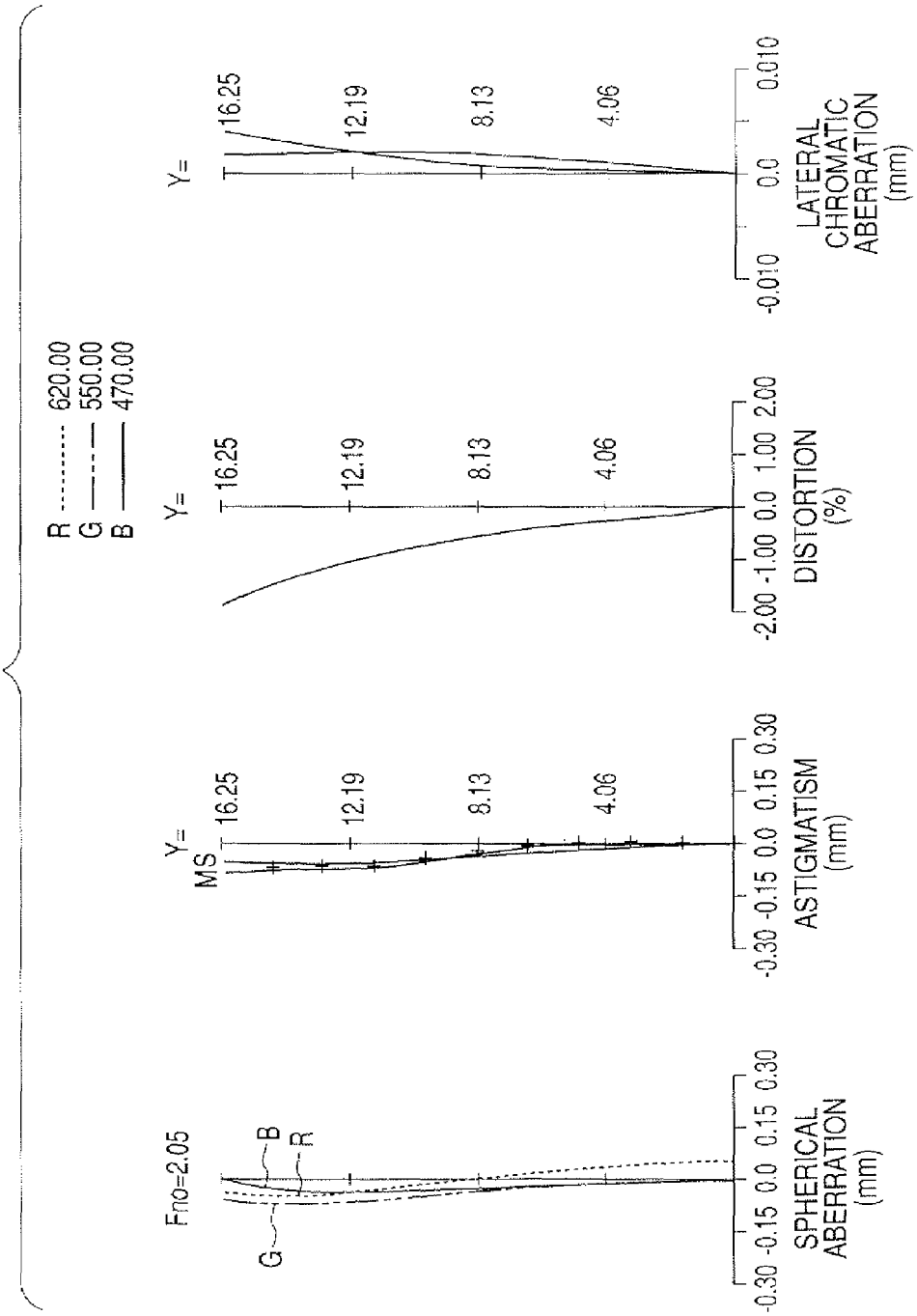
FIG. 20 is aberration diagrams at a wide-angle end of the zoom lens of Embodiment 7.
Figure 21:
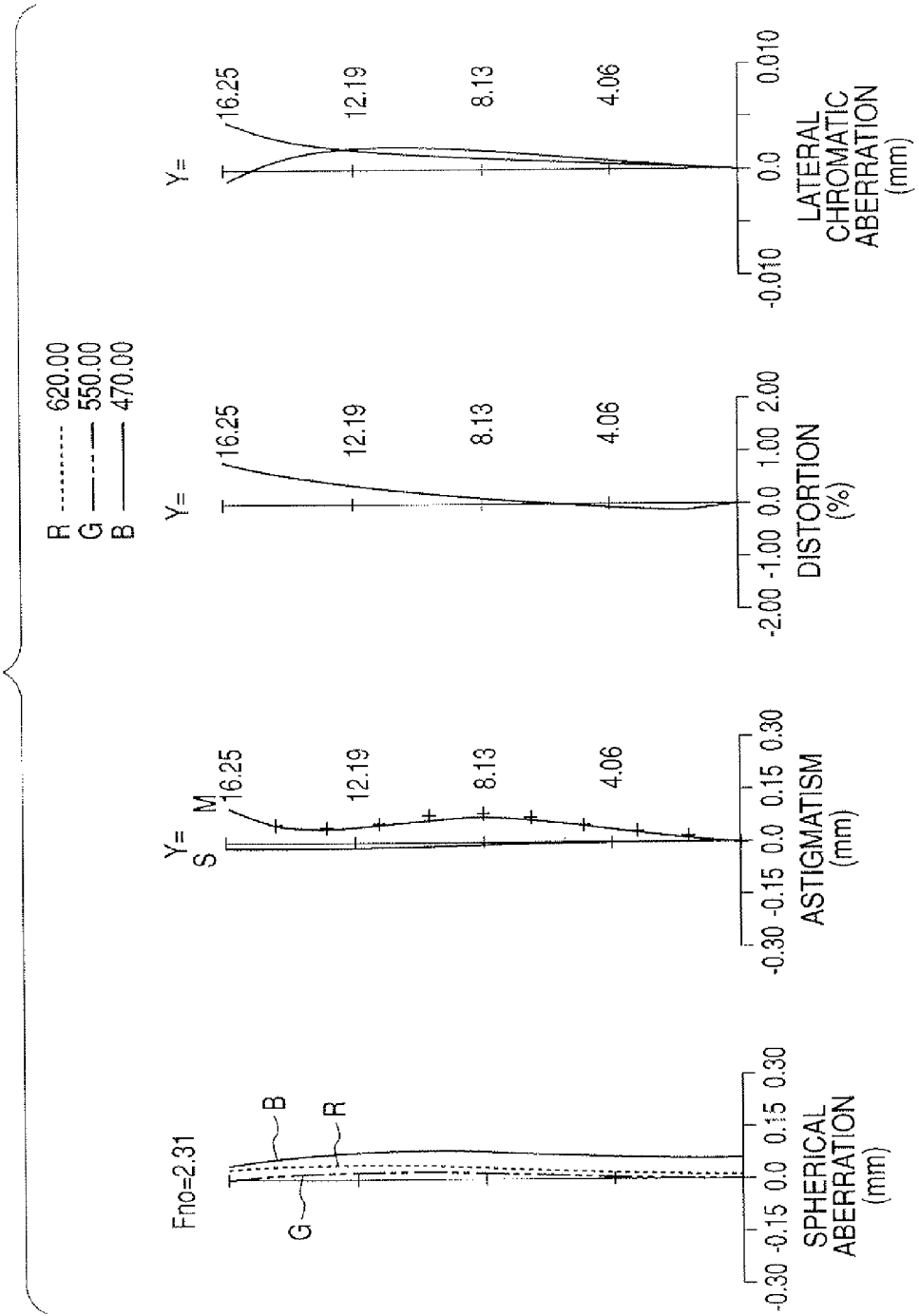
FIG. 21 is aberration diagrams at a telephoto end of the zoom lens of Embodiment 7.

FIGS. 20 and 21 are aberration diagrams at the wide-angle end and the telephoto end in a case where the length to the screen is 2100 mm in Embodiment 7.

Figure 22:
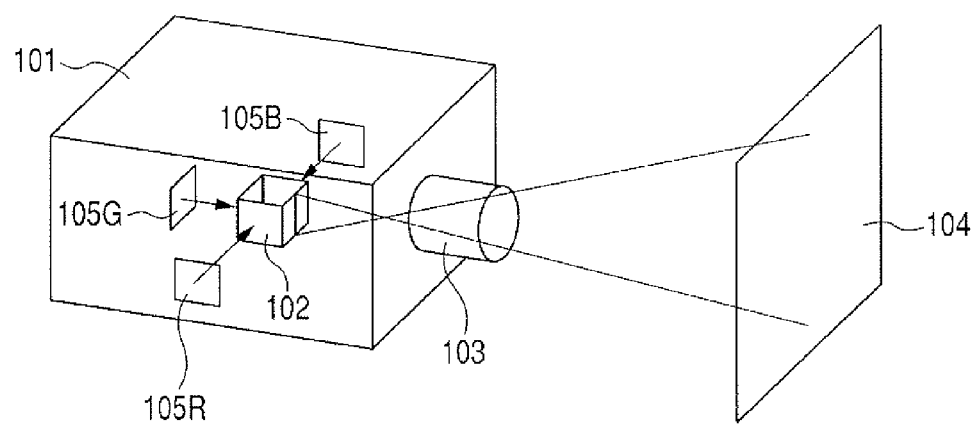
FIG. 22 is a main portion schematic view of a color liquid crystal projector.

FIG. 22 is a main portion schematic view of a color liquid crystal projector.

Figure 23:
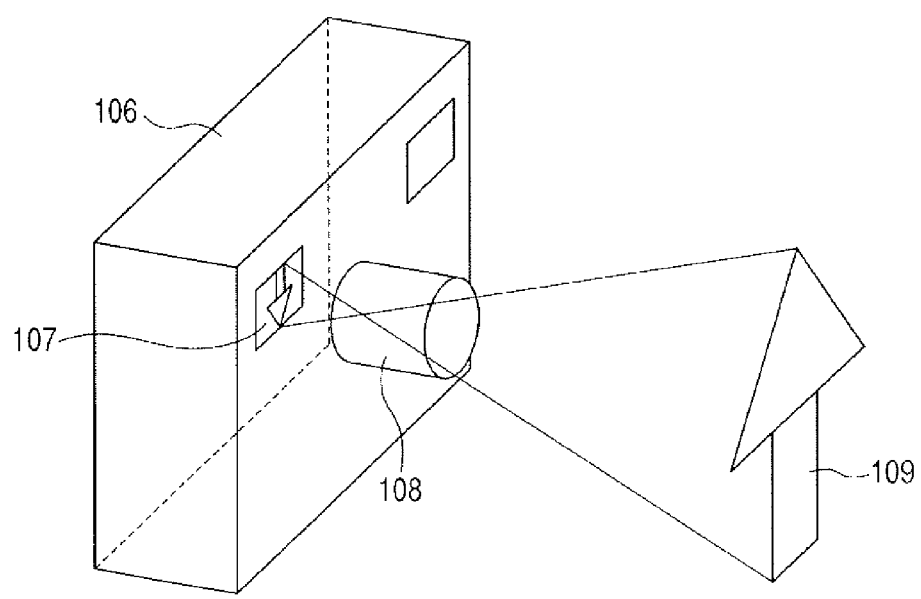
FIG. 23 is a main portion schematic view of an image pickup apparatus.

FIG. 23 is a main portion schematic view of an image pickup apparatus.

In each of the image projection apparatuses in Embodiments 1 to 7 shown in FIGS. 1, 4, 7, 10, 13, 16, and 19, an original (image to be projected) to be displayed on a liquid crystal panel LCD is enlargedly projected onto a screen surface S by using a zoom lens (projection lens) PL.

Reference symbol S denotes the screen surface (projection surface), and reference symbol LCD denotes the liquid crystal panel (liquid crystal display element). The screen surface S and the liquid crystal panel LCD are located on image planes of the zoom lens PL. The screen surface S and the liquid crystal panel LCD are in a conjugate relationship. In general, the screen surface S corresponds to a conjugate point with a longer length located on an enlargement side (front side), and the liquid crystal panel LCD corresponds to a conjugate point with a shorter length located on a reduction side (rear side). Here, the enlargement side means a screen side (a side of the surface to be projected) in the projector, and is a subject (object) side in the image pickup apparatus. Specifically, the enlargement side means a side (front side) where a length from a main surface (main point) of the lens or the lens itself to a conjugate plane (conjugate point) is larger, and the reduction side is a side (rear side) where a length from the main surface (main point) of the lens or the lens itself to a conjugate plane (conjugate point) is smaller.

Note that, when the zoom lens is used as a photographing system, the screen surface S side becomes the object side, and the liquid crystal panel LCD side becomes the image side.

Reference symbol STO denotes an aperture stop.

Reference symbol GB denotes a glass block provided in terms of optical design so as to correspond to a color combining prism (for example, a polarization beam splitter, a dichroic prism, or a dichroic prism having polarization separation characteristics), a polarization filter, a color filter, and the like.

The zoom lens PL is mounted on a main body (not shown) of the liquid crystal video projector through a connecting member (not shown). The liquid crystal display element LCD side on and after the glass block GB is included in the main body of the projector.

When i represents an order of a lens unit from the enlargement side to the reduction side, reference symbol Li denotes an i-th lens unit.

Arrows represent movement loci of the respective lens units from the wide-angle end to the telephoto end.

The liquid crystal panel LCD is illuminated with light from an illumination optical system (not shown) provided on the reduction side.

In order to ensure a favorable pupil matching property with the illumination optical system, the zoom lens PL has telecentric property in which the pupil on the liquid crystal display panel LCD side (reduction side) is located at a long distance.

The glass block GB includes unit for combining images of the respective liquid crystal panels of R, G, and B, unit for selecting only a specific polarization direction, unit for changing a phase of the polarization, and the like.

The zoom lens PL in each of the embodiments employs a plurality of lens units of a negative-lead type (located on the enlargement side), in which lenses having negative refraction power precede, thereby easily ensuring a sufficiently long back focus for disposing the glass block GB.

In order to obtain a magnification function, in the zoom lens PL of each of the embodiments, some of the lens units move on an optical axis, and a combined focal length of the entire system is changed.

In each of Embodiments 1 to 4 of FIGS. 1, 4, 7, and 10, in the case of zooming from the wide-angle end to the telephoto end, as indicated by the arrows, the second lens unit L2, the third lens unit L3, the fourth lens unit L4, and the fifth lens unit L5 are moved toward the screen S side independently of one another.

Note that the first lens unit L1 and the sixth lens unit L6 do not move for the zooming.

In each of Embodiments 5 and 6 of FIGS. 13 and 16, in the case of the zooming from the wide-angle end to the telephoto end, as indicated by the arrows, the second lens unit L2, the third lens unit L3, and the fourth lens unit L4 are moved toward the screen S side independently of one another.

Note that the first lens unit L1 and the fifth lens unit L5 do not move for the zooming.

In Embodiment 7 of FIG. 19, in the case of the zooming from the wide-angle end to the telephoto end, as indicated by the arrow, the first lens unit L1 is moved toward the enlargement side along a convex locus.

Further, the second and third lens units L2 and L3 are moved toward the enlargement side independently of each other.

Note that the fourth lens unit L4 does not move for the zooming.

In each of the embodiments, focusing is performed by moving the first lens unit L1 on the optical axis.

Note that the focusing may be performed by moving the liquid crystal panel LCD.

In each of Embodiments 5 to 7 of FIGS. 13, 16, and 19, the aperture stop STO is disposed on the reduction side of the second lens unit L2.

Further, in each of Embodiments 3 and 4 of FIGS. 7 and 10, the aperture stop STO is disposed on the reduction side of the third lens unit L3.

Then, the aperture stop STO moves in the case of the zooming.

On each lens surface, antireflection multilayer coating is implemented.

Note that, in each aberration diagram, G represents an aberration at a wavelength of 550 nm, R represents an aberration at a wavelength of 620 nm, and B represents an aberration at a wavelength of 460 nm. Both of S (inclination of a sagittal image plane) and M (inclination of meridional image plane) represent aberrations at the wavelength of 550 nm. Fno represents an F-number. ω represents a half angle of view. Y represents an image height.

The zoom lens of each of the embodiments satisfies the following conditions:

$$\nu dp > 75 \tag{1}$$

$$fw/fp < 0.6 \tag{2}$$

where

νdp: Abbe constant of a material of a positive lens Gp disposed at a position to be described later, fp: focal length of a lens unit including the positive lens Gp, and fw: focal length of the entire system at the wide-angle end.

The position of the positive lens Gp (smallest positive lens which means that hb/ha becomes the smallest and does not mean that a size thereof is the smallest) is a position which satisfies at least one of the following positions:

(1) a position where hb/ha becomes the smallest at a zoom position of at least a part within a zoom range where ha represents a height of a paraxial marginal ray when the paraxial marginal ray passes through each lens and hb represents a height of a paraxial chief ray (paraxial principal ray) when the paraxial chief ray passes through each lens, wherein in particular, hb/ha at an either position of an incident surface or emitting surface of the smallest positive lens is the smallest among hb/ha's at positions of incident surfaces and emitting surfaces of all the positive lenses in the zoom lens; and (2) a position located within a range of a length 0.2 L on the enlargement side from a negative lens Gn whose effective diameter is the smallest and which exists within a range of a length 0.6 L to a length 0.9 L from the first lens surface on the enlargement side at the wide-angle end wherein "within the range of the length 0.6 L to the length 0.9 L from the first lens surface on the enlargement side" represents that a point on the optical axis on the enlargement-side surface of the negative lens Gn is located on the reduction side of the position of the length 0.6 L and that a point on the optical axis on the reduction-side surface of the negative lens Gn is located on the enlargement side of the position of the length 0.9 L;

"within the range of the length 0.2 L on the enlargement side from the negative lens Gn" represents a range from the point on the optical axis on the enlargement-side surface of the negative lens Gn to a point on the optical axis on a reduction conjugate-side surface of the positive lens Gp; and the "height" represents a length (length in a direction perpendicular to the optical axis) from the optical axis of the zoom lens.

The Abbe constant νd and a partial dispersion ratio θgF to be described later are as follows, νd=(Nd−1)/(NF−NC), θgF=(Ng−NF)/(NF−NC), where Ng, Nd, NF, and NC represent refractive indices of the material with respect to g-line, d-line, F-line, and C-line, respectively.

The paraxial marginal ray means a paraxial ray made incident parallel to the optical axis of the optical system at a height thereof from the optical axis taken as 1 when the focal length of the entire optical system is normalized to be 1. Further, the paraxial chief rayparaxial chief ray means a paraxial ray passing through an intersection of an entrance pupil of the optical system and the optical axis thereof among rays incident at −45° with respect to the optical axis when the focal length of the entire optical system is normalized to be 1. A clockwise incident angle of the optical system measured from the optical axis is defined to be positive, and a counterclockwise incident angle thereof is defined to be negative.

Note that the rays are assumed to be emitted from the enlargement side (screen side in this embodiment). Then, the screen is assumed to be located on the left side of the optical system, and the rays incident from the screen side onto the optical system are assumed to travel from the left side to the right side.

When a construction satisfying the conditional expressions (1) and (2) is adopted, a spherical aberration can be effectively corrected.

If hb/ha is not the smallest, or a material with an Abbe constant less than the lower limit of the conditional expression (1) is used, then the zoom lens becomes more sensitive to the lateral chromatic aberration as the positive lens Gp is bent.

Therefore, a degree of freedom in correcting the spherical aberration is decreased, making it difficult to obtain favorable optical performance.

Further, the positive lens Gp has a role to effectively correct variations of the spherical aberration in the case of the zooming. Therefore, when the positive lens Gp is disposed in such a lens unit which performs the magnification and exceeds the upper limit of the conditional expression (2), it becomes difficult to obtain the favorable optical performance.

Furthermore, the negative lens Gn whose effective diameter is the smallest is disposed within the range of 0.6 L to 0.9 L from the first lens surface on the enlargement side at the wide-angle end where L represents the overall lens length (length from the first lens surface to the final lens surface). Then, the positive lens Gp satisfying the conditional expression (1) is disposed at the position located within the range of the length 0.2 L on the enlargement side of the negative lens Gn.

Here, the position where the positive lens Gp satisfying the conditional expression (1) is disposed is redefined by using a geometric expression method.

The negative lens Gn disposed on the reduction side of the aperture stop STO compensates the spherical aberration, a paraxial chromatic aberration, and the like, which are generated in the lens unit which performs the magnification and has positive refractive power. The negative lens Gn undesirably acts so as to generate the lateral chromatic aberration.

Therefore, it is preferable to dispose the negative lens Gn at a position where hb/ha is small so that the influence on the lateral chromatic aberration becomes smallest.

Specifically, in the negative lens Gn disposed at a position where the height of an off-axis ray is the lowest, the effective diameter thereof becomes the smallest. Further, empirically, the negative lens Gn is disposed substantially within the range of the length 0.6 L to the length 0.9 L from the first lens surface on the enlargement side.

Further, in the vicinity (within a range of a length 2 L toward the enlargement side) of the enlargement side of the negative lens Gn, there exists a position where an incident height hb becomes 0. Accordingly, the positive lens Gp disposed within the range establishes a condition substantially equivalent to that where hb/ha is the smallest.

Note that, it is preferable that the lower limit value is 85 in the conditional expression (1), because the sensitivity to the lateral chromatic aberration becomes lower and the effect of correcting the spherical aberration is increased.

In each of the embodiments, the value of hb/ha of each lens is the smallest in both of the cases where the positive lens Gp is located at the wide-angle end and the telephoto end.

In the positive lens Gp satisfying the conditional expression (1), hb/ha thereof is the smallest at both of the wide-angle end and the telephoto end, so that it becomes thereby easy to favorably correct the spherical aberration in the entire zoom range.

Further, in each of the embodiments, the following condition is satisfied:

$$|hb/ha|<0.3 \quad (3)$$

When the lens GP is disposed at a position where the conditional expression (3) is satisfied, the sensitivity to the lateral chromatic aberration becomes low, and the effect of correcting the spherical aberration is further obtained.

Further, in each of the embodiments, when vdn represents an Abbe constant of a material of the negative lens Gn, the following condition is satisfied:

$$vdn<40 \quad (4)$$

The negative lens Gn whose effective diameter is the smallest effectively compensates the paraxial chromatic aberration generated in the lens unit which performs the magnification and has positive refractive power. Therefore, it is preferable to use a glass material which satisfies the conditional expression (4).

Further, in each of the embodiments, the following condition is satisfied:

$$\theta gFp-(0.6438-0.001682\times vdp)>0.017 \quad (5),$$

where θgFP represents the partial dispersion ratio of the material of the positive lens Gp.

According to Yoshiya Matsui, "Lens Design Method", a coefficient Tv of the lateral chromatic aberration is represented as follows:

$$Tv = hv\left(\bar{h}v\frac{Nv}{rv} - \bar{\alpha}v\right) \cdot \Delta v\left(\frac{\delta N}{N}\right)$$

where $\bar{h}$ represents height of off-axis chief ray, N represents refractive index, r represents curvature radius, and $\bar{\alpha}$ represents an angle of off-axis chief ray. Note that, in this specification, h is expressed as ha, and $\bar{h}$ is expressed as hb. Further, $\bar{\alpha}$ is expressed as αa.

As is obvious from this expression, by configuring the height hb of the off-axis chief ray small, the term depending on the curvature radius r can be made less sensitive, so that the degree of freedom in correcting the spherical aberration is increased.

Here, a position of the positive lens Gp in an optical path is a position where the angle αa of the off-axis chief ray becomes relatively large. Accordingly, since the term of αa does not depend on the curvature radius r according to the above-mentioned expression, it can be understood that the effect of correcting the lateral chromatic aberration is obtained without affecting the spherical aberration.

Hence, a glass material having not only low dispersion characteristic but also anomalous dispersion characteristic is used as the glass material of the positive lens Gp, thus making it possible to simultaneously impart an effect of reducing the lateral chromatic aberration to the positive lens Gp.

Further, since ha becomes large at the position of the positive lens Gp in the optical path, it is preferable that the material of the positive lens Gp be the glass material having the anomalous dispersion characteristic also in terms of favorably correcting the paraxial chromatic aberration.

Note that, when the lower limit value is 0.033 in the conditional expression (5), the effects of correcting the lateral chromatic aberration and the axial chromatic aberration become larger, which is preferable.

In each of the embodiments, it is recommended to use, for example, fluorite ($CaF_2$) as the material satisfying both of the conditional expressions (1) and (5).

In each of the embodiments, a positive lens Gp2 is disposed on the reduction side of the positive lens Gp. Then, respectively, the following condition is satisfied:

$$\theta gFp2(0.6438-0.001682\times vdp2)>0.005 \quad (6),$$

where vdp2 and θgFp2 represent an Abbe constant and partial dispersion ratio of a material of the positive lens Gp2, respectively.

When a glass material satisfying the conditional expression (6) is used for the positive lens Gp2 disposed on the reduction side of the positive lens Gp satisfying the conditional expression (1), the effect of correcting the lateral chromatic aberration is obtained, which is preferable.

Further, in each of the embodiments, a negative lens Gn2 is disposed on the enlargement side of the positive lens Gp. The following condition is satisfied:

$$\theta gFn2(0.6438-0.001682\times vdn2)>0.010 \quad (7),$$

where vdn2 and θgFn2 represent an Abbe constant and partial dispersion ratio of a material of the negative lens Gn2, respectively.

When a glass material satisfying the conditional expression (7) is used for the negative lens Gn2 disposed on the enlargement side of the positive lens Gp satisfying the conditional expression (1), the effect of correcting the lateral chromatic aberration is obtained, which is preferable.

In each of the embodiments, the positive lens Gp3 is cemented to the negative lens Gn2. Then, the following conditions are satisfied:

$$\theta gFp3-(0.6438-0.001682\times vdp3)<0.005 \quad (8), \text{ and}$$

$$Da/|ra|>0.25 \quad (9),$$

where vdp3 and θgFp3 represent an Abbe constant and partial dispersion ratio of a material of the positive lens Gp3, respectively, ra represents a curvature radius of a cemented surface of both of the lenses, and Da represents an effective diameter of the cemented surface.

By satisfying the conditional expressions (8) and (9), a more significant effect of correcting the lateral chromatic aberration can be obtained, which is preferable.

Further, in each of the embodiments, the positive lens Gp4 is disposed on the enlargement side of the positive lens Gp. The following condition is satisfied:

$$\theta gFp4(0.6438-0.001682\times vdp4)<-0.003 \quad (10),$$

where an Abbe constant and partial dispersion ratio of the positive lens Gp4 are represented by vdp4 and θgFp4, respectively.

When a glass material satisfying the conditional expression (10) is used for the positive lens Gp4 disposed on the enlargement conjugate side of the positive lens Gp satisfying the conditional expression (1), the effect of correcting the lateral chromatic aberration is obtained, which is preferable.

Further, in each of the embodiments, when the following condition is satisfied:

$$ft/fw > 1.25 \quad (12),$$

where ft represents a focal length of the entire system at the telephoto end.

The zoom lens in each of the embodiments is particularly effective in the case of satisfying the conditional expression (12). When the lower limit value of the conditional expression (12) is 1.4, a more preferable effect can be obtained.

Note that, the zoom lens of each of the embodiments is configured telecentric in the reduction side. The term "telecentric" in the present invention refers to a case of satisfying at least one of the following conditions:

$$0.4 < |Dpw/L| \quad (11), \text{ and}$$

$$0.4 < |Dpt/L|,$$

where Dpw and Dpt represent lengths from the reduction-side conjugate plane (liquid crystal panel LCD) on a reduction side pupil position at the wide-angle end and the telephoto end, respectively, and L represents the overall lens length (length from the first lens surface to the final lens surface).

In the case of the telecentric optical system, the angle αa of the off-axis chief ray becomes large, and the correction of the lateral chromatic aberration becomes easier.

It is preferable to use at least one aspherical lens for the zoom lens in each of the embodiments since the variety of aberrations can be favorably corrected.

As described above, according to each of the embodiments, a telecentric zoom lens can be obtained, in which the lateral chromatic aberration, the spherical aberration, and the variations thereof accompanying the zooming are effectively corrected regardless of a high zoom ratio, an wide angle of view, and an large aperture.

A description will be made of features of the zoom lens of each of the embodiments while referring to the drawings.

Embodiment 1

As illustrated in FIG. 1, Embodiment 1 is a zoom lens including six lens units, which is formed by arranging refractive powers (optical powers=inverse numbers of the focal lengths) of the first to sixth lens units L1 to L6 having the refractive powers which are negative, positive, positive, negative, positive, and positive in order from the enlargement side to the reduction side.

A description will be made below of the construction of each of the lens units while assuming that the lens units are arranged sequentially from the enlargement side to the reduction side.

The first lens unit L1 includes a meniscus negative lens G11 in which a surface on the enlargement side is a convex surface, negative lenses G12 and G13 having aspherical surfaces, and a meniscus positive lens G14 in which a surface on the reduction side is a convex surface.

The negative lens G11 has a surface on the reduction side in which the incident height hb of the paraxial chief ray is small and is formed to have negative refractive power for achieving a wide angle and a surface on the enlargement side in which the incident height hb of the paraxial chief ray is large and is formed to have positive refractive power having an effect of correcting a distortion.

Further, the negative lenses G12 and G13 have strong refractive powers for the wide angle of view, and in addition, effectively correct the distortion.

The positive lens G14 corrects the variety of aberrations generated in the negative lenses.

The second lens unit L2 includes a cemented lens G21a formed by a positive biconvex lens G21 and a meniscus negative lens G22 having a convex surface on the reduction side, and a meniscus positive lens G23 in which a surface on the enlargement side is a convex surface.

The second lens unit L2 is a moving lens unit which moves for the zooming, and has the strongest positive refractive power among four moving lens units. In the case of the zooming, the combined focal length of the entire system is largely changed by the movement of the second lens unit L2. Specifically, the second lens unit L2 plays a main role in magnification of the entire system by the movement thereof.

Further, the positive lens G21 and the negative lens G22 in the second lens unit L2 satisfy the conditional expressions (8) and (7), respectively.

Further, a cemented surface of the positive lens G21 and the negative lens G22 satisfies the conditional expression (9). A glass material which reduces a secondary spectrum is used for the second lens unit L2 in which the incident height hb of the paraxial chief ray is large, whereby the lateral chromatic aberration is effectively corrected.

The third lens unit L3 includes a positive lens G31 satisfying both of the conditional expressions (1) and (5). The third lens unit L3 is a moving lens unit which moves for the zooming. The third lens unit L3 corrects the variations of the spherical aberration generated by the movement of the second lens unit L2 as the group playing a main role of the magnification, and simultaneously, corrects the lateral chromatic aberration and the paraxial chromatic aberration.

The fourth lens unit L4 includes a demented lens G41a formed by a negative lens G41 satisfying the conditional expression (4) and a meniscus positive lens G42 in which a surface on the enlargement side is a convex surface. The fourth lens unit L4 compensates the aberration generated in the second lens unit L2.

The fifth lens unit L5 includes a positive biconvex lens G51 and a positive lens G52 including an aspherical surface. The fifth lens unit L5 moves for the zooming, and favorably corrects the lateral chromatic aberration and field curvature in the entire zoom range.

The sixth lens unit L6 includes a positive lens G61. The sixth lens unit L6 functions to weaken the combined refractive power of the first to fifth lens units L1 to L5, and optically acts to widen the angle of view and to enlarge the aperture advantageously.

The sixth lens unit L6 satisfies the conditional expression (6), and favorably corrects the lateral chromatic aberration.

A zoom ratio of the zoom lens of Embodiment 1 is 1.65. As illustrated in FIGS. 2 and 3, the zoom lens of Embodiment 1 has good optical characteristics at both of the wide-angle end and the telephoto end.

Embodiment 2

As illustrated in FIG. 4, Embodiment 2 is a zoom lens including six lens units, which is formed by arranging refractive powers of the first to sixth lens units L1 to L6 having the refractive powers which are negative, positive, positive, positive, negative, and positive in order from the enlargement side to the reduction side.

Lens constructions of the first lens unit L1 and the sixth lens unit L6 are similar to those of Embodiment 1.

The second lens unit L2 includes a cemented lens G21a formed by the positive biconvex lens G21 and the meniscus negative lens G22 having a convex surface on the reduction side. The second lens unit L2 moves for the zooming, and has the strongest positive refractive power among four moving lens units.

Further, in a similar manner as in Embodiment 1, the positive lens G21 and the negative lens G22 satisfy the conditional expressions (8) and (7), respectively.

Further, a cemented surface of the positive lens G21 and the negative lens G22 satisfies the conditional expression (9).

The second lens unit L2 effectively corrects the lateral chromatic aberration.

The third lens unit L3 includes the meniscus positive lens G31 having a convex surface on the enlargement side. The third lens unit L3 moves for zooming, and performs the magnification together with the second lens unit L2.

In a similar manner as the third lens unit L3 of Embodiment 1, the fourth lens unit L4 includes the positive lens G41 satisfying both of the conditional expressions (1) and (5). The fourth lens unit L4 moves for the zooming. The fourth lens unit L4 corrects the variations of the spherical aberration generated by the movements of the second and third lens units L2 and L3 which performs the magnification, and simultaneously, corrects the lateral chromatic aberration and the axial chromatic aberration.

The fifth lens unit L5 includes a triplet lens G51a composed by sandwiching the negative lens G52 satisfying the conditional expression (4) by the positive lenses G51 and G53, and positive lenses G54 and G55 including aspherical surfaces. The fifth lens unit L5 moves for the zooming. The fifth lens unit L5 compensates the aberrations generated in the second and third lens units L2 and L3 which performs the magnification, and favorably corrects the lateral chromatic aberration and the field curvature in the entire zoom range.

A zoom ratio of Embodiment 2 is 1.65. As illustrated in FIGS. 5 and 6, the zoom lens of Embodiment 2 has good optical characteristics at both of the wide-angle end and the telephoto end.

Embodiment 3

As illustrated in FIG. 7, Embodiment 3 is a zoom lens including six lens units having the same arrangement of refractive powers as in Embodiment 1.

Lens constructions of the second lens unit L2, the third lens unit L3, and the sixth lens unit L6 are similar to those of Embodiment 2.

The first lens unit L1 is different from that of Embodiment 2 in that the positive lens G14 is a biconvex lens.

The fourth lens unit L4 includes the cemented lens G41a formed by the positive lens G41 satisfying both of the conditional expressions (1) and (5) and the negative lens G42 satisfying the conditional expression (4).

The fourth lens unit L4 compensates the aberrations generated during zooming performed by the second lens unit L2 and the third lens unit L3, and simultaneously, reduces the variations of the spherical aberration, corrects the lateral chromatic aberration, and corrects the axial chromatic aberration.

The fifth lens unit L5 includes the meniscus negative lens G51 having a convex surface on the reduction side, the positive lens G52 made of an anomalous dispersion material, and the positive lens G53 including an aspherical surface.

The fifth lens unit L5 moves for the zooming. The fifth lens unit L5 effectively corrects a higher-order chromatic aberration by the positive lens G52 formed of the anomalous dispersion material. The fifth lens unit L5 favorably corrects the field curvature and astigmatism by the negative lens G51 and the positive lens G53.

A zoom ratio of Embodiment 3 is 1.78.

As illustrated in FIGS. 8 and 9, the zoom lens of Embodiment 3 has good optical characteristics at both of the wide-angle end and the telephoto end.

Embodiment 4

As illustrated in FIG. 10, Embodiment 4 is a zoom lens for, for example, a reflection-type projector, in which the optical block inserted into the reduction side of the final lens surface is long. Embodiment 4 is a zoom lens including six lens units, which is formed by arranging refractive powers of the first to sixth lens units L1 to L6 having the refractive powers which are negative, positive, positive, positive, positive, and positive in order from the enlargement side to the reduction side.

Lens constructions of the fourth lens unit L4 and the sixth lens unit L6 are similar to those of Embodiment 2.

The first lens unit L1 includes the meniscus negative lens G11 having a convex surface on the enlargement side, and the negative lenses G12 and G13 including aspherical surfaces.

The respective lenses G11, G12, and G13 constituting the first lens unit L1 have similar optical functions to those of Embodiment 2. In addition, the negative lens G11 satisfies the conditional expression (7), and corrects the lateral chromatic aberration.

The second lens unit L2 includes the meniscus positive lens G21 having a convex surface on the reduction side. The third lens unit L3 includes the meniscus positive lens G31 having a convex surface on the enlargement side.

The second and third lens units L2 and L3 move during zooming, and play a main role of magnification.

The positive lens G31 of the third lens unit L3 satisfies the conditional expression (10), and effectively corrects the lateral chromatic aberration.

The fifth lens unit L5 is composed of a cemented lens G51a formed by the negative biconcave lens G51 which satisfies the conditional expression (4), and the positive biconvex lens G52, a cemented lens G53a formed of the negative lens G53 and the positive lens G54, and the positive biconvex lens G55.

The fifth lens unit L5 plays a role to compensate the aberrations generated in the second to fourth lens units L2 to L4, and in addition, favorably corrects the lateral chromatic aberration and the field curvature in the entire zoom range.

A zoom ratio of Embodiment 4 is 1.66. As illustrated in FIGS. 11 and 12, the zoom lens of Embodiment 4 has good optical characteristics at both of the wide-angle end and the telephoto end.

Embodiment 5

As illustrated in FIG. 13, Embodiment 5 is a zoom lens including five lens units, which is formed by arranging refractive powers of the first to fifth lens units L1 to L5 having the refractive powers which are negative, positive, negative, positive, and positive in order from the enlargement side to the reduction side.

The second lens unit L2 of Embodiment 5 has a construction in which the second lens unit L2 and the third lens unit L3 of Embodiment 3 in FIG. 7 are integrated. Accordingly, Embodiment 5 obtains a similar effect as that of Embodiment 3.

Embodiment 7

As illustrated in FIG. 19, Embodiment 7 is a zoom lens including four lens units, which is formed by arranging refractive powers of the first to fourth lens units L1 to L4 having the refractive powers which are negative, positive, negative, and positive in order from the enlargement side to the reduction side.

In Embodiment 7, the first lens unit L1 moves for the zooming. Embodiment 7 has substantially the same construction as that of Embodiment 5 of FIG. 13, in which the third lens unit L3 and the fourth lens unit L4 are integrated. Accordingly, Embodiment 7 obtains a similar effect to that of Embodiment 5.

A zoom ratio of Embodiment 7 is 1.48. As illustrated in FIGS. 20 and 21, the zoom lens of Embodiment 7 has good optical characteristics at both of the wide-angle end and the telephoto end.

Next, Table 1 shows correspondence relationships between the positive lens Gp, the positive lens Gp2, the positive lens Gp3, the positive lens Gp4, the negative lens Gn, and the negative lens Gn2, which are described above, and the lenses constituting the zoom lenses of the respective embodiments.

TABLE 1

| | Numerical Embodiment | | | | | | |
|---|---|---|---|---|---|---|---|
| | 1 | 2 | 3 | 4 | 5 | 6 | 7 |
| Lens Gp | Lens G31 | Lens G41 | Lens G41 | | Lens G41 | Lens G31 | Lens G31 | Lens G31 |
| Lens Gn | Lens G41 | Lens G52 | Lens G42 | | Lens G51 | Lens G32 | Lens G41 | Lens G32 |
| Lens Gp2 | Lens G61 | Lens G61 | Lens G52 · G61 | Lens G61 | Lens G42 · G51 | Lens G51 | Lens G34 · G41 |
| Lens Gn2 | Lens G22 | Lens G22 | Lens G22 | Lens G11 | Lens G22 | Lens G11 | Lens G21 · G22 |
| Lens Gp3 | Lens G21 | Lens G21 | Lens G21 | — | Lens G21 | — | Lens G21 |
| Lens Gp4 | Lens G21 | Lens G21 | Lens G14 · G21 | Lens G31 | Lens G14 · G21 | Lens G14 · G21 | Lens G14 · G21 |

A zoom ratio of Embodiment 5 is 1.48. As illustrated in FIGS. 14 and 15, the zoom lens of Embodiment 5 has good optical characteristics at both of the wide-angle end and the telephoto end.

Embodiment 6

As illustrated in FIG. 16, Embodiment 6 is a zoom lens including five lens units, which is formed by arranging refractive powers of the first to fifth lens units L1 to L5 having the refractive powers which are negative, positive, positive, negative, and positive in order from the enlargement side to the reduction side.

The first lens unit L1 of Embodiment 6 has a construction in which the first lens unit L1 and the second lens unit L2 of Embodiment 4 in FIG. 10 are integrated. Accordingly, Embodiment 6 obtains a similar effect to that of Embodiment 4.

A zoom ratio of Embodiment 6 is 1.48. As illustrated in FIGS. 17 and 18, the zoom lens of Embodiment 6 has good optical characteristics at both of the wide-angle end and the telephoto end.

FIG. 22 is a schematic view showing a main portion of an embodiment of the image projection apparatus of the present invention.

FIG. 22 shows an image projection apparatus in which the above-described zoom lens is applied to a color liquid crystal projector of a three plate type. In the color liquid projector, a plurality of pieces of image information of a plurality of chromatic rays of light, which is based on a plurality of liquid crystal panels, is combined through color combining unit 102, and the combined image information is enlargedly projected on a screen surface 104 by using a zoom lens 103.

In FIG. 22, a color liquid crystal projector 101 combines the respective color light beams (R, G and B) from three liquid crystal panels 105R, 105G, and 105B of R, G and B into one optical path by a prism 102 as the color combining unit. Then, the color liquid crystal projector 101 projects the light beams onto the screen surface 104 by using a projection lens 103 formed of the above-described zoom lens.

FIG. 23 is a schematic view showing a main portion of an embodiment of the image pickup apparatus of the present invention. In this embodiment, an example is shown, in which the above-described zoom lens is used as a photographing lens for an image pickup apparatus 106 such as a video camera, a film camera, and a digital camera.

In FIG. 23, an image of a subject 109 is formed on a photosensitive body 107 by a photographing lens 108, and image information is obtained.

As described above, according to each of the embodiments, there can be achieved the zoom lens suitable for the liquid crystal projector, which favorably corrects the various aberrations accompanying the zooming and has good optical performance over the entire screen while achieving the miniaturization of the entire lens system.

In addition, there can be achieved the zoom lens suitable for the image pickup apparatus, such as the video camera, the film camera, and the digital camera, for forming the image information on a silver halide film or a solid-state image pickup element (photoelectric transducer) such as a CCD sensor or a CMOS sensor.

Numerical embodiments 1 to 7 corresponding to the zoom lenses of Embodiments 1 to 7, respectively, are illustrated below. In each of the numeric embodiments, i represents an order of the optical surfaces from the enlargement side (front side), ri represents the curvature radius of the i-th optical surface (i-th surface), and di represents an interval between the i-th surface and an (i+1)-th surface. Units of ri and di are mm. Further, ni and vi represent the refractive index and Abbe constant of the i-th optical member, respectively, with the d-line being a reference therefor. Further, fw and ft represent the focal lengths at the wide-angle end and the telephoto end, respectively. Fno represents the F-number.

Further, the value of hb/ha in each of the lenses is also shown.

Further, the aspherical surface shape can be represented by:

$$x = (h^2/r)/[1+[1-(1+k)(h/R)^2]^{1/2}] + Ah^4 + Bh^6 + Ch^8 + Dh^{10} + Eh^{12}$$

where k represents a conic constant, A, B, C, D, and E represent aspherical coefficients, x represents displacement in the optical axis direction at the position of the height h from the optical axis with a surface vertex as a reference, and r is a paraxial curvature radius.

Note that, "e-Z" means "$10^{-Z}$", for example.

Table 2 shows relationships between the lens constructions and the various numeric values in the above-described respective Conditional expressions 1 to 12 and numerical embodiments 1 to 7.

Further, Table 3 shows geometric numeric values corresponding to a condition of claim 2 in the respective embodiments.

According to this embodiment, the zoom lens which favorably corrects the generated various aberrations accompanying the zooming and which has good optical performance over the entire screen can be obtained.

Numerical embodiment 1
fw: 19.43
ft: 32.09
Fno: 1.75 to 2.65

| | Curvature radius: r | Surface interval: d | Refractive index: Nd | Abbe constant: vd | Anomalous dispersion quantity | h/h at wide-angle end | h/h at telephoto end |
|---|---|---|---|---|---|---|---|
| Screen | | 1760.00 | | | | | |
| 1 | 81.97 | 3.00 | 1.51633 | 64.1 | −0.0007 | −4.370 | −2.636 |
| 2 | 27.05 | 9.56 | | | | −3.612 | −2.351 |
| 3(*) | 500.00 | 4.00 | 1.52996 | 55.8 | — | −2.977 | −1.847 |
| 4(*) | 39.16 | 14.48 | | | | −2.518 | −1.629 |
| 5 | −32.17 | 2.10 | 1.60311 | 60.6 | −0.0003 | −1.672 | −1.069 |
| 6 | 193.63 | 1.91 | | | | −1.565 | −0.998 |
| 7 | −244.72 | 4.25 | 1.68893 | 31.1 | 0.0089 | −1.483 | −0.955 |
| 8 | −52.89 | (variable) | | | | −1.392 | −0.908 |
| 9 | 125.11 | 9.63 | 1.83400 | 37.2 | −0.0037 | −0.833 | −0.844 |
| 10 | −42.61 | 2.30 | 1.84666 | 23.8 | 0.0167 | −0.774 | −0.769 |
| 11 | −147.48 | 0.15 | | | | −0.741 | −0.738 |
| 12 | 54.79 | 4.82 | 1.60342 | 38.0 | 0.0037 | −0.710 | −0.712 |
| 13 | 1980.24 | (variable) | | | | −0.670 | −0.671 |
| 14(#) | 44.31 | 3.13 | 1.43875 | 94.9 | 0.0535 | 0.252 | −0.356 |
| 15 | −326.89 | (variable) | | | | 0.325 | −0.313 |
| 16 | −36.15 | 1.20 | 1.80518 | 25.4 | 0.0151 | 0.441 | 0.455 |
| 17 | 23.82 | 4.00 | 1.48749 | 70.2 | 0.0043 | 0.490 | 0.501 |
| 18 | 145.48 | (variable) | | | | 0.606 | 0.630 |
| 19 | 58.03 | 9.65 | 1.48749 | 70.2 | 0.0043 | 0.866 | 0.830 |
| 20 | −32.27 | 0.15 | | | | 1.023 | 1.039 |
| 21(*) | −76.31 | 4.00 | 1.52996 | 55.8 | — | 1.056 | 1.067 |
| 22(*) | −56.20 | (variable) | | | | 1.135 | 1.158 |
| 23 | 590.94 | 4.55 | 1.80518 | 25.4 | 0.0151 | 1.212 | 2.038 |
| 24 | −63.28 | 2.00 | | | | 1.277 | 2.153 |
| Prism | | 31.34 | 1.51633 | 64.1 | −0.0007 | 1.401 | 2.314 |

Anomalous dispersion quantity = θgF − (0.6438 − 0.001682 × vd)
(*)Aspherical surface
(#)position where low dispersion material relevant to this matter is used

| Surface interval | | |
|---|---|---|
| Surface number | Wide-angle end | Telephoto end |
| 8 | 19.42 | 1.25 |
| 13 | 36.75 | 18.00 |
| 15 | 3.17 | 24.41 |
| 18 | 5.17 | 3.81 |
| 22 | 0.60 | 17.64 |

| Aspherical surface coefficient | | | | | | |
|---|---|---|---|---|---|---|
| Surface number | K | A | B | C | D | E |
| 3 | 0.000E+00 | 3.152E−05 | −6.984E−08 | 1.398E−10 | −1.531E−13 | 9.151E−17 |
| 4 | 0.000E+00 | 2.863E−05 | 1.565E−07 | −6.575E−08 | −5.781E−14 | 4.097E−17 |
| 21 | 0.000E+00 | −2.198E−05 | 2.712E−08 | −1.511E−10 | 8.650E−13 | −1.027E−15 |
| 22 | −4.710E−01 | −1.537E−05 | 2.622E−08 | −1.106E−10 | 5.266E−13 | −4.827E−16 |

Numerical embodiment 2
fw: 19.43
ft: 32.07
Fno: 1.75 to 2.64

| | Curvature radius: r | Surface interval: d | Refractive index: Nd | Abbe constant: νd | Anomalous dispersion quantity | h/h at wide-angle end | h/h at telephoto end |
|---|---|---|---|---|---|---|---|
| Screen | | 1760.00 | | | | −4.263 | −2.533 |
| 1 | 74.37 | 2.80 | 1.51633 | 64.1 | −0.0007 | −3.548 | −2.270 |
| 2 | 26.56 | 7.40 | | | | −3.094 | −1.883 |
| 3(*) | 120.94 | 4.00 | 1.52996 | 55.8 | — | −2.613 | −1.657 |
| 4(*) | 29.91 | 15.16 | | | | −1.692 | −1.050 |
| 5 | −31.02 | 1.90 | 1.48749 | 70.2 | 0.0043 | −1.567 | −0.973 |
| 6 | 157.67 | 2.80 | | | | −1.454 | −0.913 |
| 7 | −119.73 | 3.92 | 1.68893 | 31.1 | 0.0089 | −1.369 | −0.869 |
| 8 | −49.04 | (variable) | | | | −0.777 | −0.806 |
| 9 | 186.25 | 7.50 | 1.83400 | 37.2 | −0.0037 | −0.733 | −0.749 |
| 10 | −43.03 | 2.10 | 1.80518 | 25.4 | 0.0151 | −0.700 | −0.718 |
| 11 | −168.59 | (variable) | | | | −0.630 | −0.678 |
| 12 | 45.01 | 4.65 | 1.60342 | 38.0 | 0.0037 | −0.589 | −0.638 |
| 13 | 290.13 | (variable) | | | | 0.129 | −0.465 |
| 14(#) | 64.36 | 2.63 | 1.49699 | 81.5 | 0.0310 | 0.179 | −0.434 |
| 15 | −487.26 | (variable) | | | | 0.451 | 0.462 |
| 16 | −80.30 | 3.34 | 1.48749 | 70.2 | 0.0043 | 0.526 | 0.551 |
| 17 | −20.09 | 1.20 | 1.80518 | 25.4 | 0.0151 | 0.589 | 0.603 |
| 18 | 22.38 | 5.72 | 1.48749 | 70.2 | 0.0043 | 0.738 | 0.761 |
| 19 | −60.02 | 4.09 | | | | 0.917 | 0.935 |
| 20(*) | −1000.00 | 3.00 | 1.52996 | 55.8 | — | 0.986 | 1.005 |
| 21(*) | −979.34 | 0.15 | | | | 1.005 | 1.017 |
| 22 | −884.68 | 7.30 | 1.68893 | 31.1 | 0.0089 | 1.099 | 1.121 |
| 23 | −31.50 | (variable) | | | | 1.206 | 2.065 |
| 24 | 278.00 | 3.80 | 1.80518 | 25.4 | 0.0151 | 1.265 | 2.168 |
| 25 | −96.79 | 2.00 | | | | 1.376 | 2.319 |
| Prism | | 31.34 | 1.51633 | 64.1 | −0.0007 | | |

Anomalous dispersion quantity = θgF − (0.6438 − 0.001682 × νd)
(*)Aspherical surface
(#)Used position where low dispersion material relevant to this matter

| | Surface interval | |
|---|---|---|
| Surface number | Wide-angle end | Telephoto end |
| 8 | 20.50 | 1.28 |
| 11 | 2.50 | 0.70 |
| 13 | 32.34 | 10.15 |
| 15 | 7.37 | 30.93 |
| 23 | 0.60 | 20.25 |

| | | | Aspherical surface coefficient | | | |
|---|---|---|---|---|---|---|
| Surface number | K | A | B | C | D | E |
| 3 | 0.000E+00 | 2.084E−05 | −4.667E−08 | 1.052E−10 | −1.207E−13 | 8.556E−17 |
| 4 | 0.000E+00 | 1.627E−05 | −5.403E−08 | 1.085E−10 | −1.095E−13 | 1.462E−16 |
| 20 | 0.000E+00 | −3.638E−05 | −1.040E−08 | 2.920E−10 | −1.776E−12 | 3.593E−15 |
| 21 | 0.000E+00 | −3.099E−05 | 8.851E−09 | 1.540E−11 | −1.845E−13 | 3.928E−17 |

Numerical embodiment 3
fw: 21.11
ft: 37.63
Fno: 2.05 to 3.10

| | Curvature radius: r | Surface interval: d | Refractive index: Nd | Abbe constant: νd | Anomalous dispersion quantity | h/h at wide-angle end | h/h at telephoto end |
|---|---|---|---|---|---|---|---|
| Screen | | 2100.00 | | | | | |
| 1 | 86.89 | 2.80 | 1.66672 | 48.3 | −0.0017 | −4.493 | −2.960 |
| 2 | 27.01 | 7.06 | | | | −3.751 | −2.630 |
| 3(*) | 61.54 | 4.00 | 1.52996 | 55.8 | — | −3.221 | −2.210 |
| 4(*) | 28.29 | 14.93 | | | | −2.828 | −1.975 |
| 5 | −38.18 | 2.20 | 1.48749 | 70.2 | 0.0043 | −1.945 | −1.359 |
| 6 | 78.73 | 1.37 | | | | −1.816 | −1.273 |
| 7 | 149.34 | 5.60 | 1.83400 | 37.2 | −0.0037 | −1.638 | −1.159 |
| 8 | −77.52 | (variable) | | | | −1.533 | −1.095 |
| 9 | 50.32 | 8.05 | 1.83400 | 37.2 | −0.0037 | −0.802 | −1.008 |
| 10 | −73.15 | 2.00 | 1.84666 | 23.8 | 0.0167 | −0.728 | −0.943 |
| 11 | −1273.83 | (variable) | | | | −0.702 | −0.913 |
| 12 | 53.05 | 2.68 | 1.58144 | 40.7 | 0.0021 | −0.136 | −0.548 |
| 13 | 261.15 | 2.00 | | | | −0.084 | −0.509 |
| 14(STO) | | (variable) | | | | — | — |
| 15(#) | 39.89 | 3.75 | 1.49699 | 81.5 | 0.0310 | 0.260 | 0.171 |
| 16 | −30.75 | 1.00 | 1.74950 | 35.3 | 0.0024 | 0.373 | 0.298 |
| 17 | 34.95 | (variable) | | | | 0.435 | 0.348 |
| 18 | −29.62 | 1.40 | 1.76182 | 26.5 | 0.0144 | 0.982 | 0.632 |
| 19 | 317.53 | 0.15 | | | | 1.061 | 0.677 |
| 20 | 55.46 | 9.76 | 1.49699 | 81.5 | 0.0310 | 1.236 | 0.772 |
| 21 | −28.89 | 0.54 | | | | 1.451 | 1.040 |
| 22(*) | −754.32 | 4.00 | 1.52996 | 55.8 | — | 1.579 | 1.113 |
| 23(*) | −72.70 | (variable) | | | | 1.710 | 1.219 |
| 24 | 91.93 | 4.81 | 1.80518 | 25.4 | 0.0151 | 1.844 | 2.632 |
| 25 | −134.17 | 2.00 | | | | 1.976 | 2.821 |
| Prism | | 29.60 | 1.51633 | 64.1 | −0.0007 | 2.148 | 3.036 |

Anomalous dispersion quantity = θgF − (0.6438 − 0.001682 × νd)
(*)Aspherical surface
(#)position where low dispersion material relevant to this matter is used

| Surface interval | | |
|---|---|---|
| Surface number | Wide-angle end | Telephoto end |
| 8 | 29.91 | 1.73 |
| 11 | 23.02 | 17.46 |
| 14 | 2.00 | 14.72 |
| 17 | 16.36 | 5.03 |
| 23 | 0.60 | 32.95 |

| Aspherical surface coefficient | | | | | | |
|---|---|---|---|---|---|---|
| Surface number | K | A | B | C | D | E |
| 3 | 2.866E+00 | 4.355E−06 | 2.219−10 | −1.806E−11 | 4.379E−14 | −3.309E−17 |
| 4 | 0.000E+00 | −1.786E−06 | −7.853E−10 | −5.400E−11 | 1.284E−13 | −1.350E−16 |
| 22 | 0.000E+00 | −1.598E−05 | 2.628E−10 | −1.415E−10 | 4.643E−13 | −2.044E−16 |
| 23 | 8.666E+00 | −5.745E−06 | 7.820E−09 | −1.073E−10 | 3.578E−13 | −7.986E−17 |

Numerical embodiment 4
fw: 16.74
ft: 27.83
Fno: 1.85 to 2.77

| | Curvature radius: r | Surface interval: d | Refractive index: Nd | Abbe constant: νd | Anomalous dispersion quantity | h/h at wide-angle end | h/h at telephoto end |
|---|---|---|---|---|---|---|---|
| Screen | | 2100.00 | | | | | |
| 1 | 34.61 | 2.20 | 1.76182 | 26.5 | 0.0144 | −3.916 | −2.342 |
| 2 | 21.69 | 6.10 | | | | −3.534 | −2.200 |
| 3(*) | 50.00 | 3.50 | 1.52996 | 55.8 | — | −3.109 | −1.870 |
| 4(*) | 24.36 | 12.58 | | | | −2.753 | −1.698 |
| 5 | −25.13 | 1.60 | 1.48749 | 70.2 | 0.0043 | −1.886 | −1.155 |
| 6 | 72.60 | (Variable) | | | | −1.772 | −1.086 |
| 7 | −298.89 | 5.11 | 1.74950 | 35.3 | 0.0024 | −1.325 | −0.928 |
| 8 | −44.66 | (Variable) | | | | −1.254 | −0.880 |
| 9 | 60.75 | 3.47 | 1.80610 | 40.9 | −0.0049 | −0.769 | −0.835 |
| 10 | 2621.93 | 29.05 | | | | −0.745 | −0.807 |
| 11(STO) | | (Variable) | | | | — | — |
| 12(#) | 43.15 | 3.40 | 1.49699 | 81.5 | 0.0310 | −0.007 | −0.345 |
| 13 | −124.34 | (Variable) | | | | 0.042 | −0.311 |
| 14 | −98.26 | 1.00 | 1.83400 | 37.2 | −0.0037 | 0.222 | 0.277 |
| 15 | 16.52 | 5.79 | 1.48749 | 70.2 | 0.0043 | 0.247 | 0.302 |
| 16 | −28.65 | 3.13 | | | | 0.365 | 0.435 |
| 17 | −14.58 | 1.10 | 1.83400 | 37.2 | −0.0037 | 0.446 | 0.528 |
| 18 | 601.35 | 5.51 | 1.48749 | 70.2 | 0.0043 | 0.433 | 0.533 |
| 19 | −18.10 | 0.15 | | | | 0.544 | 0.640 |
| 20 | 183.89 | 7.63 | 1.48749 | 70.2 | 0.0043 | 0.536 | 0.647 |
| 21 | −23.05 | (Variable) | | | | 0.618 | 0.737 |
| 22 | 1068.17 | 2.73 | 1.80518 | 25.4 | 0.0151 | 0.673 | 1.209 |
| 23 | −71.85 | 2.00 | | | | 0.693 | 1.245 |
| Prism | | 23.61 | 1.51633 | 64.1 | −0.0007 | 0.754 | 1.322 |
| Prism | | 18.00 | 1.80518 | 25.4 | 0.0151 | 1.325 | 2.199 |

Anomalous dispersion quantity = θgF − (0.6438 − 0.001682 × νd)
(*)Aspherical surface
(#)position where low dispersion material relevant to this matter is used

| | Surface interval | | |
|---|---|---|---|
| Surface number | Wide-angle end | Telephoto end | |
| 6 | 10.10 | 5.80 | |
| 8 | 21.36 | 0.70 | |
| 11 | 11.65 | 0.15 | |
| 13 | 6.91 | 25.70 | |
| 21 | 0.94 | 18.61 | |

| | | | Aspherical surface coefficient | | | |
|---|---|---|---|---|---|---|
| Surface number | K | A | B | C | D | E |
| 3 | −8.653E−01 | 7.403E−06 | 4.648E−09 | 1.287E−10 | −5.312E−13 | 1.045E−15 |
| 4 | −4.329E+00 | 3.140E−05 | −8.824E−08 | 4.914E−10 | −1.821E−12 | 3.347E−15 |

Numerical embodiment 5
fw: 21.13
ft: 31.31
Fno: 2.05 to 2.69

| | Curvature radius: r | Surface interval: d | Refractive index: Nd | Abbe constant: νd | Anomalous dispersion quantity | h/h at wide-angle end | h/h at telephoto end |
|---|---|---|---|---|---|---|---|
| Screen | | 2100.00 | | | | | |
| 1 | 77.68 | 2.55 | 1.67003 | 47.2 | −0.0017 | −4.669 | −3.061 |
| 2 | 26.87 | 6.95 | 1.52996 | 55.8 | — | −3.912 | −2.724 |
| 3(*) | 58.90 | 4.00 | | | | −3.374 | −2.310 |
| 4(*) | 28.21 | 14.39 | | | | −2.966 | −2.072 |
| 5 | −41.16 | 1.90 | 1.48749 | 70.2 | 0.0043 | −2.039 | −1.443 |
| 6 | 70.17 | 4.61 | | | | −1.908 | −1.360 |
| 7 | 114.57 | 5.90 | 1.83400 | 37.2 | −0.0037 | −1.668 | −1.210 |
| 8 | −87.63 | (Variable) | | | | −1.566 | −1.150 |
| 9 | 58.84 | 7.68 | 1.83400 | 37.2 | −0.0037 | −0.799 | −1.061 |
| 10 | −61.52 | 1.55 | 1.84666 | 23.8 | 0.0167 | −0.730 | −1.008 |
| 11 | −580.42 | 21.32 | | | | −0.706 | −0.978 |
| 12 | 63.34 | 2.83 | 1.51742 | 52.4 | 0.0008 | −0.141 | −0.476 |
| 13 | −1146.18 | 2.00 | | | | −0.082 | −0.428 |
| 14 (STO) | | (Variable) | | | | — | — |
| 15(#) | 43.46 | 4.09 | 1.49699 | 81.5 | 0.0310 | 0.199 | 0.136 |
| 16 | −24.99 | 1.00 | 1.60342 | 38.0 | 0.0037 | 0.302 | 0.252 |
| 17 | 34.61 | (Variable) | | | | 0.357 | 0.297 |
| 18 | −26.07 | 1.25 | 1.84666 | 23.8 | 0.0167 | 0.998 | 0.578 |
| 19 | −348.51 | 1.21 | | | | 1.082 | 0.621 |
| 20 | 77.86 | 9.77 | 1.49699 | 81.5 | 0.0310 | 1.246 | 0.706 |
| 21 | −27.01 | 0.15 | | | | 1.457 | 0.972 |
| 22(*) | 1560.18 | 4.00 | 1.52996 | 55.8 | — | 1.582 | 1.036 |
| 23(*) | −90.84 | (Variable) | | | | 1.711 | 1.139 |
| 24 | 98.42 | 5.04 | 1.80518 | 25.4 | 0.0151 | 1.857 | 2.517 |
| 25 | −108.52 | 2.00 | | | | 1.994 | 2.706 |
| Prism | | 29.60 | 1.51633 | 64.1 | −0.0007 | 2.164 | 2.914 |

Anomalous dispersion quantity = θgF − (0.6438 − 0.001682 × νd)
(*)Aspherical surface
(#)position where low dispersion material relevant to this matter is used

| | Surface interval | |
|---|---|---|
| Surface number | Wide-angle end | Telephoto end |
| 8 | 25.32 | 1.93 |
| 14 | 5.27 | 14.05 |
| 17 | 11.62 | 5.38 |
| 23 | 0.60 | 21.45 |

| | Aspherical surface coefficient | | | | |
|---|---|---|---|---|---|
| Surface number | K | A | B | C | D | E |
| 3 | 2.866E+00 | 5.002E−06 | −2.162E−09 | −1.963E−11 | 4.982E−14 | −4.230E−17 |
| 4 | 0.000E+00 | 5.070E−07 | −4.014E−09 | −5.190E−11 | 1.253E−13 | −1.390E−16 |
| 20 | 0.000E+00 | −1.556E−05 | 1.796E−10 | −1.640E−10 | 4.447E−13 | −4.266E−16 |
| 21 | 1.663E+01 | −5.252E−06 | 3.578E−09 | −1.034E−10 | 2.675E−13 | −1.308E−16 |

Numerical embodiment 6
fw: 16.76
ft: 24.75
Fno: 1.85 to 2.32

| | Curvature radius: r | Surface interval: d | Refractive index: Nd | Abbe constant: νd | Anomalous dispersion quantity | h/h at wide-angle end | h/h at telephoto end |
|---|---|---|---|---|---|---|---|
| Screen | | 2100.00 | | | | | |
| 1 | 38.72 | 2.20 | 1.51633 | 64.1 | −0.0007 | −4.161 | −2.617 |
| 2 | 22.53 | 6.34 | | | | −3.701 | −2.420 |
| 3(*) | 50.00 | 3.50 | 1.52996 | 55.8 | — | −3.290 | −2.090 |
| 4(*) | 24.47 | 11.62 | | | | −2.915 | −1.893 |
| 5 | −29.90 | 1.60 | 1.60738 | 56.8 | 0.0001 | −2.100 | −1.347 |
| 6 | 55.36 | 9.37 | | | | −1.980 | −1.272 |
| 7 | −1218.55 | 5.61 | 1.83400 | 37.2 | −0.0037 | −1.491 | −0.989 |
| 8 | −45.56 | (Variable) | | | | −1.403 | −0.945 |
| 9 | 54.47 | 3.75 | 1.71999 | 50.2 | −0.0072 | −0.635 | −0.839 |
| 10 | −1201.92 | 22.30 | | | | −0.608 | −0.815 |
| 11(STO) | | (Variable) | | | | — | — |
| 12(#) | 62.75 | 3.22 | 1.49699 | 81.5 | 0.0310 | 0.127 | −0.013 |
| 13 | −43.69 | (Variable) | | | | 0.177 | 0.030 |
| 14 | −35.28 | 1.00 | 1.83400 | 37.2 | −0.0037 | 0.221 | 0.162 |
| 15 | 26.53 | 5.05 | 1.48749 | 70.2 | 0.0043 | 0.241 | 0.178 |
| 16 | −27.43 | 2.35 | | | | 0.336 | 0.271 |
| 17 | −19.81 | 1.10 | 1.83400 | 37.2 | −0.0037 | 0.396 | 0.330 |
| 18 | 122.58 | 4.50 | 1.48749 | 70.2 | 0.0043 | 0.398 | 0.334 |
| 19 | −24.31 | 3.90 | | | | 0.484 | 0.415 |
| 20 | 288.98 | 6.19 | 1.48749 | 70.2 | 0.0043 | 0.559 | 0.482 |
| 21 | −26.50 | (Variable) | | | | 0.626 | 0.550 |
| 22 | 67.14 | 2.97 | 1.80518 | 25.4 | 0.0151 | 0.684 | 0.985 |
| 23 | −422.16 | 2.00 | | | | 0.705 | 1.015 |
| Prism | | 23.61 | 1.51633 | 64.1 | −0.0007 | 0.751 | 1.072 |
| Prism | | 18.00 | 1.80518 | 25.4 | 0.0151 | 1.322 | 1.798 |

Anomalous dispersion quantity = $\theta gF - (0.6438 - 0.001682 \times \nu d)$
(*)Aspherical surface
(#)position where low dispersion material relevant to this matter is used

| | Surface interval | | |
|---|---|---|---|
| Surface number | Wide-angle end | Telephoto end | |
| 8 | 34.54 | 4.06 | |
| 11 | 16.40 | 23.96 | |
| 13 | 1.66 | 5.49 | |
| 21 | 0.81 | 19.90 | |

| | | Aspherical surface coefficient | | | | |
|---|---|---|---|---|---|---|
| Surface number | K | A | B | C | D | E |
| 3 | −8.653E−01 | 1.474E−05 | −6.168E−08 | 3.536E−10 | −9.183E−13 | 1.132E−15 |
| 4 | −4.329E+00 | 4.185E−05 | −1.837E−07 | 8.647E−10 | −2.541E−12 | 3.431E−15 |

Numerical embodiment 7
fw: 21.12
ft: 31.33
Fno: 2.05 to 2.31

| | Curvature radius: r | Surface interval: d | Refractive index: Nd | Abbe constant: νd | Anomalous dispersion quantity | h/h at wide-angle end | h/h at telephoto end |
|---|---|---|---|---|---|---|---|
| Screen | | (Variable) | | | | | |
| 1 | 88.34 | 2.55 | 1.65844 | 50.9 | −0.0022 | −4.694 | −3.032 |
| 2 | 27.01 | 6.90 | | | | −3.913 | −2.691 |
| 3(*) | 60.54 | 4.00 | 1.52996 | 55.8 | — | −3.373 | −2.282 |
| 4(*) | 28.71 | 14.21 | | | | −2.971 | −2.050 |
| 5 | −44.60 | 1.90 | 1.48749 | 70.2 | 0.0043 | −2.056 | −1.438 |
| 6 | 63.06 | 4.91 | | | | −1.926 | −1.356 |
| 7 | 99.19 | 6.48 | 1.83400 | 37.2 | −0.0037 | −1.674 | −1.199 |
| 8 | −94.95 | (Variable) | | | | −1.565 | −1.137 |
| 9 | 69.85 | 7.39 | 1.83400 | 37.2 | −0.0037 | −0.767 | −1.056 |
| 10 | −60.11 | 1.55 | 1.84666 | 23.8 | 0.0167 | −0.705 | −1.007 |
| 11 | −357.19 | 22.62 | | | | −0.683 | −0.979 |
| 12 | 50.17 | 3.96 | 1.48749 | 70.2 | 0.0043 | −0.144 | −0.486 |
| 13 | −114.02 | 2.00 | | | | −0.069 | −0.424 |
| 14(STO) | | (Variable) | | | | — | — |
| 15(#) | −342.59 | 2.81 | 1.49699 | 81.5 | 0.0310 | 0.063 | −0.189 |
| 16 | −27.39 | 1.00 | 1.60342 | 38.0 | 0.0037 | 0.127 | −0.121 |
| 17 | 75.95 | 19.63 | | | | 0.156 | −0.100 |
| 18 | −27.26 | 1.25 | 1.76182 | 26.5 | 0.0144 | 1.080 | 0.748 |
| 19 | 1405.73 | 0.15 | | | | 1.175 | 0.798 |
| 20 | 59.41 | 10.11 | 1.49699 | 81.5 | 0.0310 | 1.259 | 0.825 |
| 21 | −26.61 | 0.60 | | | | 1.459 | 1.064 |
| 22(*) | 1961.59 | 4.00 | 1.52996 | 55.8 | — | 1.563 | 1.132 |
| 23(*) | −133.30 | (Variable) | | | | 1.714 | 1.239 |
| 24 | 99.77 | 4.60 | 1.80518 | 25.4 | 0.0151 | 1.852 | 2.512 |
| 25 | −135.46 | 2.00 | | | | 1.981 | 2.688 |
| Prism | | 29.60 | 1.51633 | 64.1 | −0.0007 | 2.147 | 2.892 |

Anomalous dispersion quantity = θgF − (0.6438 − 0.001682 × νd)
(*)Aspherical surface
(#)position where low dispersion material relevant to this matter is used

| Surface number | Surface interval | |
| --- | --- | --- |
| | Wide-angle end | Telephoto end |
| Screen | 2100.00 | 2103.06 |
| 8 | 28.39 | 1.95 |
| 14 | 2.00 | 5.87 |
| 23 | 0.60 | 20.11 |

| Surface number | Aspherical surface coefficient | | | | | |
| --- | --- | --- | --- | --- | --- | --- |
| | K | A | B | C | D | E |
| 3 | 2.866E+00 | 6.953E−06 | −6.237E−09 | −1.736E−11 | 5.577E−14 | −4.693E−17 |
| 4 | 0.000E+00 | 2.596E−06 | −8.452E−09 | −5.571E−11 | 1.564E−13 | −1.675E−16 |
| 22 | 0.000E+00 | −2.575E−05 | −1.740E−08 | −1.603E−10 | 4.215E−13 | −8.473E−17 |
| 23 | 3.340E+01 | −1.470E−05 | −8.537E−09 | −1.054E−10 | 3.817E−13 | −1.843E−16 |

TABLE 2

| Embodiment | Lens unit construction | (1) $\nu d$ | (2) fw/fp | (3) * | (4) $\nu d$ | (5) * | (6) * |
| --- | --- | --- | --- | --- | --- | --- | --- |
| 1 | NPPNPP | 95.1 | 0.218 | 0.252 | 25.4 | 0.0535 | 0.0151 |
| 2 | NPPPNP | 81.6 | 0.170 | 0.129 | 25.4 | 0.0310 | 0.0151 |
| 3 | NPPNPP | 81.6 | −0.347 | 0.171 | 35.3 | 0.0310 | 0.0151 |
| 4 | NPPPPP | 81.6 | 0.259 | −0.007 | 37.2 | 0.0310 | 0.0151 |
| 5 | NPNPP | 81.6 | −0.204 | 0.136 | 38.0 | 0.0310 | 0.0151 |
| 6 | NPPNP | 81.6 | 0.321 | −0.013 | 37.2 | 0.0310 | 0.0151 |
| 7 | NPNP | 81.6 | −0.056 | 0.063 | 38.0 | 0.0310 | 0.0151 |

| Embodiment | Lens unit construction | (7) * | (8) * | (9) R/\|r\| | (10) * | (11) Dpw/L | (11) Dpt/L | (12) Magnification |
| --- | --- | --- | --- | --- | --- | --- | --- | --- |
| 1 | NPPNPP | 0.0167 | −0.0037 | 0.503 | −0.0037 | −0.48 | −0.88 | 1.65 |
| 2 | NPPPNP | 0.0151 | −0.0037 | 0.465 | −0.0037 | −0.47 | −0.64 | 1.65 |
| 3 | NPPNPP | 0.0167 | −0.0037 | 0.264 | −0.0037 | −2.36 | 2.50 | 1.78 |
| 4 | NPPPPP | 0.0144 | — | — | −0.0049 | 2.17 | 1.18 | 1.66 |
| 5 | NPNPP | 0.0167 | −0.0037 | 0.307 | −0.0037 | 2.59 | 2.76 | 1.48 |
| 6 | NPPNP | — | — | — | −0.0049 | −2.77 | 0.84 | 1.48 |
| 7 | NPNP | 0.0167 | −0.0037 | 0.318 | −0.0037 | 2.38 | 2.56 | 1.48 |

N: negative;
P: positive
* Anomalous dispersion quantity = $\theta gF - (0.6438 - 0.001682 \times \nu d)$

TABLE 3

Values corresponding to condition of Claim 2

| Embodiment | d1 | d2 |
| --- | --- | --- |
| 1 | 0.802 L | 0.021 L |
| 2 | 0.824 L | 0.073 L |
| 3 | 0.743 L | 0 (cemented) |
| 4 | 0.807 L | 0.048 L |
| 5 | 0.761 L | 0 (cemented) |
| 6 | 0.814 L | 0.011 L |
| 7 | 0.729 L | 0 (cemented) | d1: length of lens Gn whose effective diameter is smallest from first lens surface on enlargement side when overall lens length is L
d2: length to lens Gp satisfying conditional expression (1) from lens Gn whose effective diameter is smallest While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-025738, filed Feb. 2, 2006, which is hereby incorporated by reference herein in its entirety.

What is claimed is:

1. A zoom lens, which is telecentric on a reduction side, comprising a plurality of lens units,
wherein a smallest positive lens is defined as a positive lens whose hb/ha is smallest among a plurality of positive lenses in the zoom lens in at least a part of a zoom range from a wide-angle end to a telephoto end where ha represents a height of a paraxial marginal ray passing through the zoom lens and hb represents a height of a paraxial chief ray passing through the zoom lens, the zoom lens satisfies following conditions:

$$vdp>75$$

$$fw/fp<0.6$$

where vdp indicates an Abbe constant of a material of the smallest positive lens, fp indicates a focal length of a lens unit including the smallest positive lens, and fw indicates a focal length of an entire system of the zoom lens at the wide-angle end.

2. A zoom lens according to claim 1, wherein a value of hb/ha at a position of the smallest positive lens is smallest among values of hb/ha at positions of all lenses in the zoom lens at both of the wide-angle end and the telephoto end.

3. A zoom lens according to claim 1, wherein an absolute value of hb/ha at a position of the smallest positive lens is less than 0.3.

4. A zoom lens according to claim 1, wherein the zoom lens satisfies the following condition:

$$\theta gFp-(0.6438-0.001682 \times vdp)>0.017$$

where $\theta gFp$ represents a partial dispersion ratio of material of the smallest positive lens.

5. A zoom lens according to claim 1, wherein a second positive lens is disposed on a reduction side of the smallest positive lens, and the zoom lens satisfies the following condition:

$$\theta gFp2(0.6438-0.001682 \times vdp2)>0.005$$

where vdp2 and $\theta gFp2$ represent an Abbe constant and partial dispersion ratio of material of the second positive lens, respectively.

6. A zoom lens according to claim 1, wherein a second negative lens is disposed on an enlargement side of the smallest positive lens, and the zoom lens satisfies the following condition:

$$\theta gFn2(0.6438-0.001682 \times vdn2)>0.010$$

where vdn2 and $\theta gFn2$ indicate an Abbe constant and partial dispersion ratio of a material of the second negative lens, respectively.

7. A zoom lens according to claim 6, wherein a third positive lens is cemented to the second negative lens, and the zoom lens satisfies the following conditions:

$$\theta gFp3-(0.6438-0.001682 \times vdp3)<0.005$$

$$Da/|ra|>0.25$$

where vdp3 and $\theta gFp3$ represent an Abbe constant and partial dispersion ratio of material of the third positive lens, respectively, ra represents a curvature radius of a cemented surface, and Da represents an effective diameter of the cemented surface.

8. A zoom lens according to claim 1, wherein a fourth positive lens is disposed on an enlargement side of the smallest positive lens, and the zoom lens satisfies the following condition:

$$\theta gFp4(0.6438-0.001682 \times vdp4)<-0.003$$

where vdp4 and $\theta gFp4$ indicate an Abbe constant and partial dispersion ratio of the fourth positive lens, respectively.

9. A zoom lens according to claim 1, wherein the zoom lens satisfies the following condition:

$$ft/fw>1.25$$

where ft represents a focal length of the entire system at the telephoto end.

10. An image projection apparatus, comprising:
a display unit for forming an original; and
a zoom lens for projecting the original formed by the display unit onto a surface to be projected,
wherein the zoom lens is telecentric on a reduction side and comprises a plurality of lens units, wherein a smallest positive lens is defined as a positive lens whose hb/ha is smallest among a plurality of positive lenses in the zoom lens in at least a part of a zoom range from a wide-angle end to a telephoto end where ha represents a height of a paraxial marginal ray passing through the zoom lens and hb represents a height of a paraxial chief ray passing through the zoom lens, the zoom lens satisfies following conditions:

$$vdp>75$$

$$fw/fp<0.6$$

where vdp indicates an Abbe constant of a material of the smallest positive lens, fp indicates a focal length of a lens unit including the smallest positive lens, and fw indicates a focal length of an entire system of the zoom lens at the wide-angle end.

11. An image pickup apparatus, comprising:
a photoelectric converting element; and
a zoom lens for guiding light from a subject onto the photoelectric converting element,
wherein the zoom lens is telecentric on a reduction side and comprises a plurality of lens units, wherein a smallest positive lens is defined as a positive lens whose hb/ha is smallest among a plurality of positive lenses in the zoom lens in at least a part of a zoom range from a wide-angle end to a telephoto end where ha represents a height of a paraxial marginal ray passing through the zoom lens and hb represents a height of a paraxial chief ray passing through the zoom lens, the zoom lens satisfies following conditions:

$$vdp>75$$

$$fw/fp<0.6$$

where vdp indicates an Abbe constant of a material of the smallest positive lens, fp indicates a focal length of a lens unit including the smallest positive lens, and fw indicates a focal length of an entire system of the zoom lens at the wide-angle end.

12. A zoom lens, which is telecentric on a reduction side, comprising a plurality of lens units,
wherein a first negative lens whose effective diameter is smallest is disposed within a range of a length 0.6 L to a length 0.9 L from a first lens surface which is disposed at most enlargement side of the zoom lens at a wide-angle end when an overall lens length is L,
wherein a smallest positive lens is disposed within a range of a length 0.2 L on an enlargement side of the first negative lens, and
wherein the zoom lens satisfies following conditions:

$$vdp>75,$$

$$fw/fp<0.6,$$

where vdp represents Abbe constant of material of the smallest positive lens, fp represents a focal length of a lens unit including the smallest positive lens, and fw represents a focal length of an entire system at the wide-angle end.

13. A zoom lens according to claim 12, wherein the zoom lens satisfies the following condition:

$$vdn<40$$

where vdn represents an Abbe constant of a material of the first negative lens.

14. An image projection apparatus, comprising:
a display unit for forming an original; and
a zoom lens for projecting the original formed by the display unit onto a surface to be projected,
wherein the zoom lens is telecentric on a reduction side and comprises a plurality of lens units,
wherein a first negative lens whose effective diameter is smallest is disposed within a range of a length 0.6 L to a length 0.9 L from a first lens surface which is disposed at most enlargement side of the zoom lens at a wide-angle end when an overall lens length is L,
wherein a smallest positive lens is disposed within a range of a length 0.2 L on an enlargement side of the first negative lens, and
wherein the zoom lens satisfies following conditions:

$$vdp>75,$$

$$fw/fp<0.6,$$

where vdp represents Abbe constant of material of the smallest positive lens, fp represents a focal length of a lens unit including the smallest positive lens, and fw represents a focal length of an entire system at the wide-angle end.

15. An image pickup apparatus, comprising:
a photoelectric converting element; and
a zoom lens for guiding light from a subject onto the photoelectric converting element,
wherein the zoom lens is telecentric on a reduction side and comprises a plurality of lens units,
wherein a first negative lens whose effective diameter is smallest is disposed within a range of a length 0.6 L to a length 0.9 L from a first lens surface which is disposed at most enlargement side of the zoom lens at a wide-angle end when an overall lens length is L,
wherein a smallest positive lens is disposed within a range of a length 0.2 L on an enlargement side of the first negative lens, and
wherein the zoom lens satisfies following conditions:

$$vdp>75,$$

$$fw/fp<0.6,$$

where vdp represents Abbe constant of material of the smallest positive lens, fp represents a focal length of a lens unit including the smallest positive lens, and fw represents a focal length of an entire system at the wide-angle end.

* * * * *

UNITED STATES PATENT AND TRADEMARK OFFICE
CERTIFICATE OF CORRECTION

PATENT NO. : 7,289,281 B1  Page 1 of 1
APPLICATION NO. : 11/626440
DATED : October 30, 2007
INVENTOR(S) : Shigenobu Sugita It is certified that error appears in the above-identified patent and that said Letters Patent is hereby corrected as shown below:

Title Page, after "(22) Filed: January 24, 2007" insert:

item 65 -- Prior Publication Data
US 2007/0177277 A1  Aug. 2, 2007 --

Signed and Sealed this

First Day of April, 2008

JON W. DUDAS
*Director of the United States Patent and Trademark Office*